US 007908517B2

(12) United States Patent
Itoh et al.

(10) Patent No.: US 7,908,517 B2
(45) Date of Patent: *Mar. 15, 2011

(54) INFORMATION PROCESSING APPARATUS WITH RESUME FUNCTION AND INFORMATION PROCESSING SYSTEM

(75) Inventors: Hiromichi Itoh, Yokohama (JP); Keiichi Nakane, Yokohama (JP); Naomichi Nonaka, Kawasaki (JP); Yoshinori Watanabe, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,183

(22) Filed: Dec. 2, 2009

(65) Prior Publication Data

US 2010/0083044 A1 Apr. 1, 2010

Related U.S. Application Data

(63) Continuation of application No. 12/076,799, filed on Mar. 24, 2008, now Pat. No. 7,661,029, which is a continuation of application No. 10/659,292, filed on Sep. 11, 2003, now Pat. No. 7,366,950, which is a continuation of application No. 10/285,447, filed on Nov. 1, 2002, now Pat. No. 6,662,311, which is a continuation of application No. 09/407,840, filed on Sep. 29, 1999, now Pat. No. 6,502,207, which is a continuation of application No. 08/975,054, filed on Nov. 20, 1997, now Pat. No. 5,968,186, which is a continuation of application No. 08/667,583, filed on Jun. 24, 1996, now Pat. No. 5,721,932, which is a continuation of application No. 08/001,248, filed on Jan. 6, 1993, now Pat. No. 5,592,675.

(30) Foreign Application Priority Data

Jan. 8, 1992 (JP) .................................. 4-001262

(51) Int. Cl.
G06F 11/00 (2006.01)
(52) U.S. Cl. .......................................... 714/24; 714/15
(58) Field of Classification Search .................. None
See application file for complete search history.

(56) References Cited

U.S. PATENT DOCUMENTS

| 4,051,326 A | 9/1977 | Badagnani et al. ...... 379/102.04 |
| 4,143,417 A | 3/1979 | Wald et al. ...................... 360/55 |
| 4,740,969 A | 4/1988 | Fremot |
| 4,777,595 A | 10/1988 | Strecker et al. ............... 364/200 |

(Continued)

FOREIGN PATENT DOCUMENTS

JP     54092129     7/1979

(Continued)

*Primary Examiner* — Marc Duncan
(74) *Attorney, Agent, or Firm* — Brundidge & Stanger, P.C.

(57) ABSTRACT

An information processing apparatus having a resume function which can maintain the security even when a plurality of users commonly use the apparatus. A work state at a power-off time of the apparatus is preserved together with a work state name including a user's ID in a different area in a plurality of preservation areas for resume function on a main memory for each user. When a power source is again turned on, data in the preservation area corresponding to the user's ID is used to reproduce the work state of the user at the power-off time. The work preservation areas can be provided on a file server apparatus in a network not needing battery back-up. When the information processing apparatus is used, a work state at a power-off time can be independently preserved and reproduced for each user.

5 Claims, 24 Drawing Sheets

U.S. PATENT DOCUMENTS

| | | | |
|---|---|---|---|
| 4,912,628 A | 3/1990 | Briggs | 364/200 |
| 4,922,915 A | 5/1990 | Arnold et al. | 382/128 |
| 4,949,253 A | 8/1990 | Chigira | 395/500 |
| 5,012,406 A | 4/1991 | Martin | 395/750 |
| 5,041,964 A | 8/1991 | Cole et al. | 395/425 |
| 5,075,847 A | 12/1991 | Fromme | 395/700 |
| 5,077,768 A | 12/1991 | Shigyo et al. | 398/98 |
| 5,148,546 A | 9/1992 | Blodgett | 395/750 |
| 5,193,176 A | 3/1993 | Brandin | 395/575 |
| 5,206,538 A | 4/1993 | Orta | 307/66 |
| 5,271,013 A | 12/1993 | Gleason | |
| 5,297,144 A | 3/1994 | Gilbert et al. | 370/952 |
| 5,386,552 A | 1/1995 | Garney | 395/575 |
| 5,396,636 A | 3/1995 | Gallagher et al. | 713/323 |
| 5,432,946 A | 7/1995 | Allard et al. | 713/310 |
| 5,454,099 A | 9/1995 | Myers et al. | 395/575 |
| 5,461,266 A | 10/1995 | Koreeda et al. | 307/125 |
| 5,539,885 A | 7/1996 | Ono et al. | 395/200.03 |
| 5,586,334 A | 12/1996 | Miyazaki et al. | 395/750 |
| 5,590,340 A | 12/1996 | Marita et al. | 395/750 |
| 5,592,675 A | 1/1997 | Itoh et al. | |
| 5,682,550 A | 10/1997 | Brown et al. | 395/830 |
| 5,696,897 A | 12/1997 | Dong | 395/182.13 |
| 5,708,820 A | 1/1998 | Park et al. | 395/750 |
| 5,721,932 A | 2/1998 | Itoh et al. | |
| 5,903,765 A | 5/1999 | White et al. | 713/310 |
| 5,968,186 A | 10/1999 | Itoh | |
| 6,502,207 B1 | 12/2002 | Itoh et al. | |
| 6,662,311 B2 | 12/2003 | Itoh et al. | |
| 7,366,950 B2 | 4/2008 | Itoh et al. | |
| 2008/0184052 A1 | 7/2008 | Itoh et al. | |

FOREIGN PATENT DOCUMENTS

| | | |
|---|---|---|
| JP | A5717042 | 1/1982 |
| JP | 04243340 | 8/1982 |
| JP | 04343115 | 11/1982 |
| JP | 57190443 | 11/1982 |
| JP | 58139224 | 8/1983 |
| JP | 58178426 | 10/1983 |
| JP | 5984624 | 6/1984 |
| JP | 6080355 | 5/1985 |
| JP | 60221817 | 11/1985 |
| JP | 60254946 | 12/1985 |
| JP | 61262828 | 11/1986 |
| JP | 61274526 | 12/1986 |
| JP | 6224743 | 2/1987 |
| JP | 62031232 | 2/1987 |
| JP | 63029821 | 2/1988 |
| JP | 6359613 | 3/1988 |
| JP | 01160198 | 6/1989 |
| JP | 213237 | 1/1990 |
| JP | 239312 | 2/1990 |
| JP | 260340 | 2/1990 |
| JP | 02051932 | 2/1990 |
| JP | 269812 | 3/1990 |
| JP | 02069812 | 3/1990 |
| JP | 02079111 | 3/1990 |
| JP | A293814 | 4/1990 |
| JP | 2234260 | 9/1990 |
| JP | 02249049 | 10/1990 |
| JP | 325046 | 2/1991 |
| JP | 03212716 | 9/1991 |
| JP | 03225407 | 10/1991 |
| JP | 437916 | 2/1992 |
| JP | 04278750 | 10/1992 |
| JP | 04344998 | 12/1992 |
| JP | 04370858 | 12/1992 |
| JP | 05053697 | 3/1993 |
| JP | 05127784 | 5/1993 |
| JP | 05175964 | 7/1993 |

FIG. 14

RESUME IS EXECUTED
INPUT PRESERVED WORK NAME

ITO WORK A

FIG. 15

NOW CONNECTED TO NETWORK
NETWORK CONNECTION STATE CANNOT BE REPRODUCED.
DO YOU PRESERVE WORK STATE ALTHOUGH NETWORK CONNECTION STATE CANNOT BE REPRODUCED ? (Y/N)

FIG. 16

IS WORK STATE REPRODUCED FROM FILE ? (Y/N)

Y

INPUT WORK STATE PRESERVATION FILE NAME

F : ¥RESUME¥ ITO WORK A

FIG. 17

INPUT USER NAME

ITOH

INPUT PASSWORD

SPEC

FIG. 18

MACHINE TYPE OF APPARATUS NOW IN USE IS DIFFERENT FROM THAT OF APPARATUS ON WHICH WORK STATE WAS PRESERVED. DO YOU USE ANOTHER WORK STATE PRESERVATION FILE ? (Y/N)

FIG. 19

ATTENTION

WITHIN FILES USED IN PRESERVED WORK, FOLLOWING FILES HAVE BEEN CHANGED THE CONTENTS AFTER PRESERVING WORK STATE :
  F : ¥ABCD. TXT
  C : ¥VWXY. DOC

INFORMATION PROCESSING APPARATUS WITH RESUME FUNCTION AND INFORMATION PROCESSING SYSTEM

CROSSED-REFERENCE TO RELATED APPLICATIONS

The present application is a continuation of application Ser. No. 12/076,799, filed Mar. 24, 2008, now U.S. Pat. No. 7,661,029; which is a continuation of application Ser. No. 10/659,292, filed Sep. 11, 2003, now U.S. Pat. No. 7,366,950; which is a continuation of application Ser. No. 10/285,447, filed Nov. 1, 2002, now U.S. Pat. No. 6,662,311; which is a continuation of application Ser. No. 09/407,840, filed Sep. 29, 1999, now U.S. Pat. No. 6,502,207; which is a continuation of application Ser. No. 08/975,054, filed Nov. 20, 1997, now U.S. Pat. No. 5,968,186; which is a continuation of application Ser. No. 08/667,583, filed Jun. 24, 1996, now U.S. Pat. No. 5,721,932; which is a continuation of application Ser. No. 08/001,248, filed Jan. 6, 1993, now U.S. Pat. No. 5,592,675, the contents of which are incorporated herein by reference.

BACKGROUND OF THE INVENTION

The present invention relates to an information processing apparatus such as a personal computer, and more particularly, to a resume function for reproducing the work state that existed when a power source of the processing apparatus was turned off, upon turning on the power source again. The present invention also relates to a resume function in an information processing system which has a plurality of information processing apparatuses connected through a network.

Thanks to the advance of small device mounting techniques and development of power consumption reducing techniques in recent years, personal computers, work stations, word processors and so on (hereinafter they are called "information processing apparatuses") have become increasingly smaller in size, and even notepad size products operable with a battery have recently been brought to the market. Such battery driven information processing apparatuses require a user to frequently shut off the power supply either manually or automatically in order to prevent the battery from being consumed in a short time. However, when the power source is to be turned off, the user is required to store user information, for example, a document under processing and so on, in a non-volatile storage unit, and moreover, when the power source is to be turned on again, the user must recall a program and the thus stored user information from the non-volatile storage unit. For this reason, such frequent turning-off of the power source causes a problem that efficient use of the apparatus is less likely for the user.

To attend to this problem, it is now common for a battery driven information processing apparatus be provided with a so-called resume function to store the contents of a display memory, I/O registers of input/output devices and so on in a main memory, and preserve the contents of the main memory by backing up the same with a battery before turning off the power source such that when the power source is again turned on, the contents of the display memory, the I/O registers of the input/output devices and so on preserved in the main memory are written back to the respective devices, and a state upon turning off the battery is reproduced as if the apparatus had been kept operating. Information processing apparatuses having such a resume function are disclosed, for example, in JP-A-57-17042 and JP A-2-93814.

As described above, the resume function provides an excellent information processing apparatus which can reproduce a user's work state upon again turning on the power source and does not cause the degradation of the usability of the apparatus even if the power source is frequently turned off to reduce the consumption of the battery. However, the resume function hitherto provided in information processing apparatuses does not allow the user to perform another operation while preserving a work state. Also, when a plurality of users use a single information processing apparatus in which a user has preserved a work state using the resume function, another user, when turning on the information processing apparatus, will see the preserved work state of the previous user, thereby presenting unfavorable problems regarding security and utility.

Also, since the main memory is backed up by a battery to preserve a work state, the work state can be preserved only for a limited time period the capacity of the battery.

Further, the resume function hitherto provided in information processing apparatuses allows the user to reproduce a previous work state only on the same information processing apparatus in which the user interrupted work and preserved the corresponding work state, thereby preventing the user from operating the same work on different apparatus at various locations.

The conventional resume function provided in information processing apparatuses further implies a problem that a connection state to a network cannot be correctly reproduced.

The conventional resume function provided in information processing apparatus further presents a problem that a message such as electronic mail transmitted through a network cannot be received during an automatic power-off state for reducing power consumption.

SUMMARY OF THE INVENTION

It is a first object of the present invention to provide an information processing apparatus which is capable of preserving and reproducing a plurality of work states.

It is a second object of the present invention to provide an information processing apparatus which is capable of preserving a plurality of work states without backing up a memory with a battery.

It is a third object of the present invention to provide an information, processing system which is capable of reproducing a work state on a different information processing apparatus from that in which a user interrupted work and preserved the corresponding work state.

It is a fourth object of the present invention to provide an information processing system which is capable of preserving and reproducing a work state on a first information processing apparatus operated by a user using a file in a different information processing apparatus through a network.

It is a fifth object of the present invention to provide an information processing apparatus having a resume function which is capable of correctly reproducing a work state upon again turning on the power source even if the information processing apparatus is turned off while connected to another information processing apparatus on a network.

It is a sixth object of the present invention to provide an information processing apparatus which is capable of displaying a message sent from another information processing apparatus connected thereto through a network, even if the power source of the information processing apparatus is turned off.

The first object is achieved by providing plural sets of work state preservation areas for storing information in a storage unit, and reproducing a work state of the information processing apparatus based on the information in one set of the work state preservation areas specified by the operator from among the plural sets. Since work states at a plurality of times are respectively preserved in the plural sets of the work state preservation areas, respective work states of a plurality of operators or work states of a single operator at a plurality of times are preserved and reproduced.

The second object is achieved by preserving work states in a magnetic disk drive or the like which need not be backed up by a battery. Since the work states are preserved in a magnetic disk drive or the like which need not be backed up by a battery, a main memory does not require battery back-up so that no electric power is consumed during power-off state of the information processing apparatus.

The third object is achieved by providing plural sets of work state preservation areas in a storage unit of a first information processing apparatus; accessing the storage unit of the first information processing apparatus from a second information processing apparatus through a network; and executing at least processing for storing information on work states at particular times in work state preservation areas and processing for reproducing a work state based on information stored in one set of the work state preservation areas specified by the operator from among the plural sets. Since a plurality of information processing apparatuses are connected to each other through a network, and the work state preservation areas are collectively arranged in a single information processing apparatus, the other information processing apparatuses do not require battery back-up of main memories thereof or installation of a magnetic disk drive or the like. Also, the work state can be reproduced by an information processing apparatus other than that on which the work state was preserved.

The fourth object is achieved by executing processing for storing a used state of a file in use through the network when a work state is preserved and processing for reproducing the used state of the file when the work state is reproduced. Even if another information processing apparatus in which a file being used through the network is stored sets this file in an unused state after preserving a work state of the file, since the used state of the file has been stored upon preserving the work state, the used state of the file can be reproduced on the basis of the stored contents upon reproducing the work state.

The fifth object is achieved by constantly supplying a network controller with electric power even after preserving a work state, temporarily reproducing the work state when the network controller receives a frame from the network in this state, and performing the necessary processing to maintain a connection state with another information processing apparatus. Since the network controller or a timer is kept supplied with electric power even after preserving the work state, the processing necessary to maintain the connection state with other information processing apparatuses can be continuously performed, thereby making it possible to correctly reproduce the work state when the power source is again turned on. The fifth object is also achieved by constantly supplying the timer with electric power even after preserving a work state, temporarily reproducing the work state when the timer detects the lapse of a specified time in that state, and performing processing necessary to maintain a connection state with another information processing apparatus. Since the network controller or the timer is kept supplied with electric power even after preserving the work state, the processing necessary to maintain the connection state with the other information processing apparatus can be continuously performed, thereby making it possible to correctly reproduce the work state when the power source is again turned on.

The sixth object is achieved by constantly supplying the network controller with electric power even after preserving a work state, reproducing the work state when the network controller receives a frame from the network in that state, and displaying a message to be displayed to the user, if included in the frame. Since the network controller is constantly supplied with electric power even after preserving a work state, a frame including a message can be received and the message can be displayed to the user.

Therefore, according to the present invention, since a plurality of work states can be preserved and reproduced independently of each other, the user is allowed to perform different work while preserving a particular work state. Since work states of a plurality of users can be preserved and reproduced independently of each other, even if a plurality of users operate a single information processing apparatus to use the resume function, security and utility are not damaged. Also, a work state can be preserved without using a main memory requiring back-up by a battery, which leads to realizing the resume function on an information processing apparatus or the like which does not have a battery back-up function. Since a work state on an information processing apparatus may be preserved in a different information processing apparatus connected thereto through a network, the work state may be reproduced on an information processing apparatus different from that on which the user interrupted a work and preserved the work state, thereby providing an information processing apparatus which allows the user to operate the same work at various locations. Even if an information processing apparatus is logically connected with another one through a network, a work state can be correctly preserved and reproduced, which enables the utilization of excellent features provided by the resume function, such as improvement of user-friendly operation and reduction in power consumption, in an information processing apparatus connected to a network. Further, even when an information processing apparatus is temporarily turned off while connected to a network for the purpose of reduction in power consumption, it is automatically turned on again to display a message, if arriving at the user, whereby the resume function can be utilized without damaging the serviceability provided by an information processing apparatus connected to a network such as for electronic mail and message transmission function and so on.

BRIEF DESCRIPTION OF THE DRAWINGS

The present invention will be more apparent from the following detailed description, when taken in conjunction with the accompanying drawings, in which:

FIG. 14 illustrates an example of a screen for inputting a work state name in the first embodiment;

FIG. 15 illustrates an example of an inquiry screen in the fourth embodiment of the present invention;

FIG. 16 illustrates an example of a screen for inputting a work state preservation file name;

FIG. 17 illustrates an example of a screen for inputting a user's name and a password in the fifth embodiment of the present invention;

FIG. 18 illustrates an example of a screen for displaying a message announcing that an apparatus presently in use is different from an apparatus on which a work state was preserved in the fifth embodiment of the present invention;

FIG. 19 illustrates an example of a screen for displaying a message indicating modified file contents in the fifth embodiment of the present invention;

DESCRIPTION OF THE PREFERRED EMBODIMENTS

A first embodiment of the present invention will hereinafter be described with reference to FIGS. 1, 2 and 3.

Figure 2:
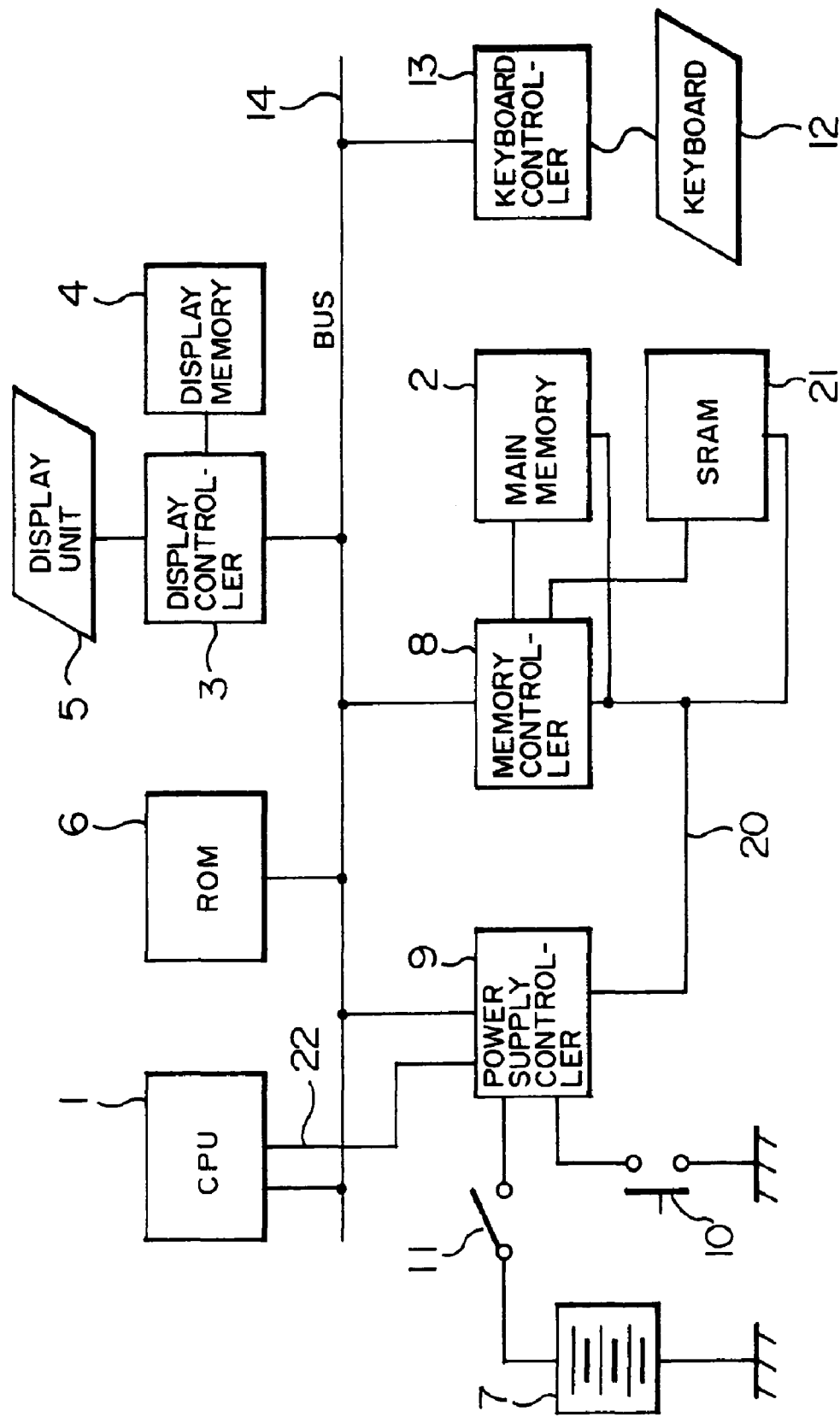
FIG. 2 is a block diagram illustrating the configuration of an information processing apparatus according to the first embodiment of the present invention.
Figure 3:
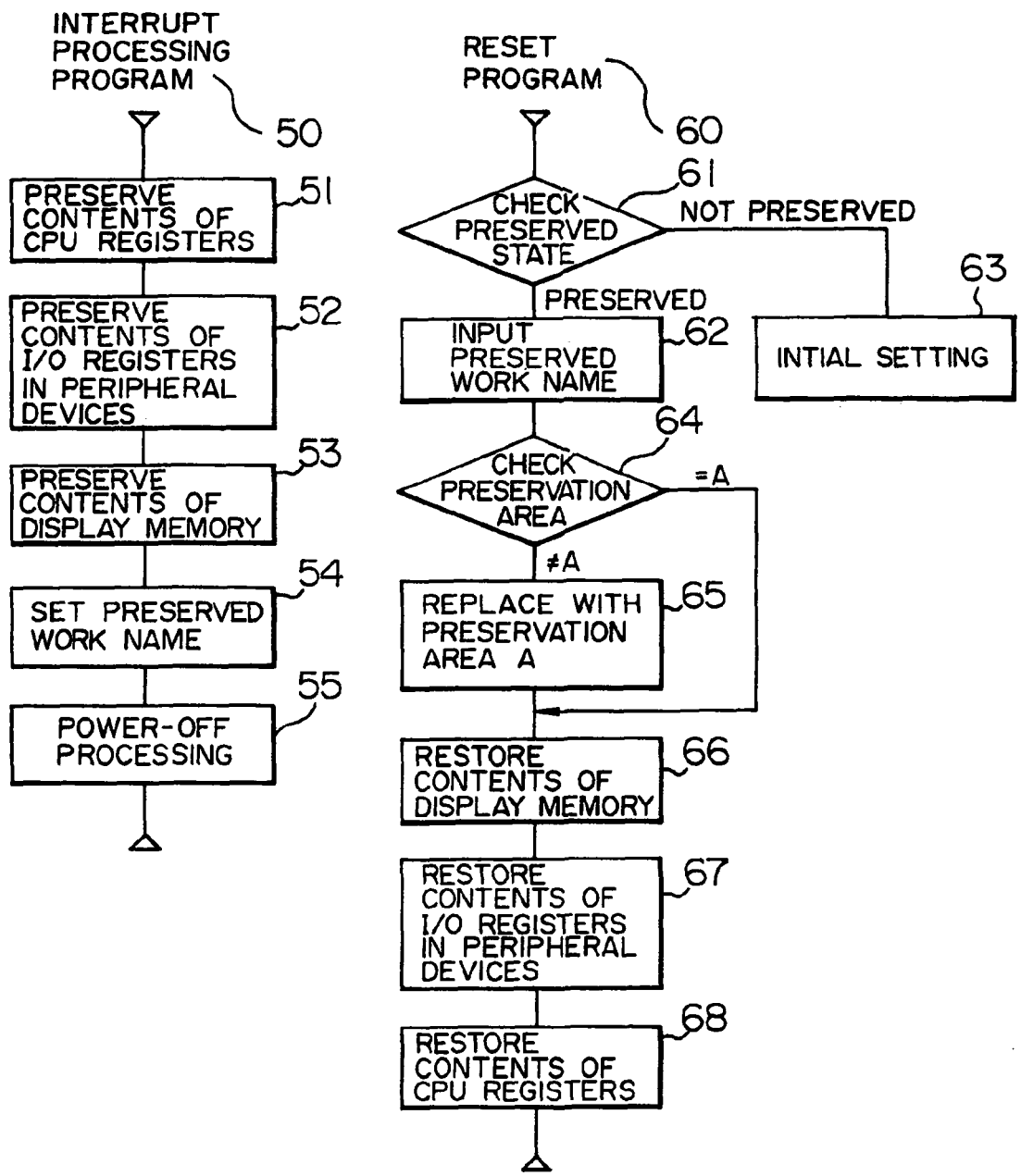
FIG. 3 is a flow chart of programs for realizing a resume function according to the first embodiment of the present invention.

FIG. 2 illustrates the configuration of a battery driven information processing apparatus of the present embodiment which comprises a CPU 1; a main memory 2 employing DRAM devices; a display controller 3; a display memory 4; a liquid crystal display 5; a ROM 6; a battery 7; a memory controller 8; a power supply controller 9; a power supply switch 10 for resume function; a main power supply switch 11; a keyboard 12; a keyboard controller 13; an address/data bus 14; a power supply line 20 for back-up; an SRAM 21; and an interrupt signal line 22.

The power supply controller 9 monitors a state of the power supply switch 10 for the resume function, a state of the battery 7, and the keyboard controller 13. If the power supply controller 9 detects, in a power-on state, that a user has depressed the power supply switch 105 for resume function, that the battery 7 has been used up, or that no input has been provided from the keyboard 12 for a predetermined amount of time, the power supply controller 9 so informs the CPU 1 through the interrupt signal line 22. The CPU 1, upon detecting the interrupt signal, executes an interrupt processing program 50 which has been previously written in the ROM 6. The processing contents of the interrupt processing program will be explained below with reference to a flow chart of FIG. 3. First, at step 51 for preservation of CPU register contents, the contents of registers in the CPU 1 are written into the main memory 2. Next, at step 52 for preservation of I/O register contents in peripheral devices, the contents of I/O registers in peripheral devices including the display controller 3 and the keyboard controller 13 are read out and stored in the main memory 2. Further, display data stored in the display memory 4 is read out and stored in the main memory 2 at step 53 for preservation of display memory contents. At step 54 for setting a preserved work name, the user is prompted to input a preserved work name which is written into the main memory 2. An example of a displayed screen for inputting a preserved work name is shown in FIG. 14. Also, at step 54 for setting a preserved work name, a value indicating that work state preservation has been completed is written into a resume flag register provided in the power supply controller 9. Next, at step 55 for power-off processing, the CPU 1 controls the power supply controller 9 so that the power supply controller 9 itself stops supplying electric power to devices other than the SRAM 21 and the memory controller 8 to set the apparatus in the power-off state. In this state, a minimum refresh operation required to preserve the stored contents in the main memory 2 constituted of DRAM devices is solely performed by the memory controller 8, whereby the battery 7 will not substantially be consumed.

Figure 1:
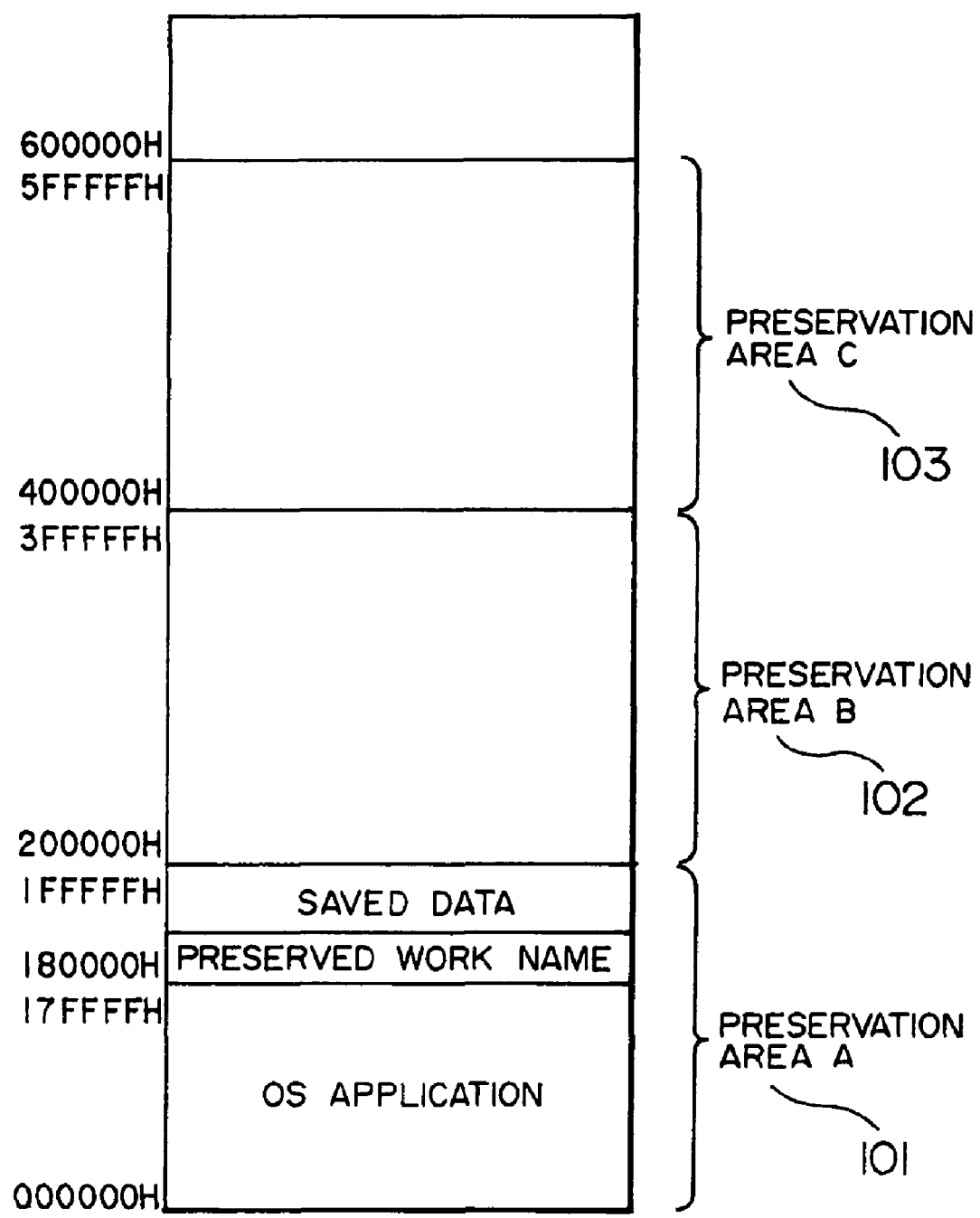
FIG. 1 illustrates an example of stored contents of a main memory in a first embodiment of the present invention.

FIG. 1 illustrates an example of stored contents in the main memory 2 of the first embodiment. The user is allowed to execute an operating system (OS) and an application program using an area from 000000H to 17FFFFH. Here, "H" is a suffix indicative of a hexadecimal number. Data saved by the interrupt processing program 50 is written into an address area from 180000H to 1FFFFFH. In this embodiment, in addition to the preservation area A 101 from 18000H to 1FFFFFH, areas from 200000H to 3FFFFFH and from 400000H to 5FFFFFH are also used as preservation areas B 102 and C 103 such that three kinds of work states can be simultaneously preserved. It should be noted that the addresses and data may be located in a manner different from that shown in FIG. 1.

When the power supply controller 9 detects in power-off state that the user has again depressed the power supply switch 10 for the resume processing function, the power supply controller 9 resumes the supply of electric power to all of the devices. In this operation, the CPU 1 first executes a reset program 60 stored in the ROM 6. As shown in FIG. 3, the reset program 60 first reads out the value of the resume flag register provided in the power supply controller 9 to check whether state preservation was performed upon turning off a power source at step 61 for state preservation check. If the result of the check shows that state preservation was not performed upon turning off the power source, a step 63 for initial setting is executed to check and initialize the main memory 2, the peripheral devices and the whole apparatus similarly to an information processing apparatus which does not have a resume function, and the apparatus is set in a state of waiting for the user to start a program. Conversely, if the check result shows that state preservation was performed upon turning off the power source, the user is prompted to input the preserved work name at step 62 for inputting a preservation area. Then, at step 64 for preserved area check, it is checked in which of the preservation areas in FIG. 1 that data related to the input preserved work name exists. If the work data specified by the preserved work name is preserved in an area other than the preservation area A 101 in the addresses from 000000H to 1FFFFFH, the work data is replaced with the contents in the preservation area A 101 at step 65 for replacement with the preservation area A. For example, if the preserved work name indicates the preservation area B 102 is at step 64 for preservation area check, the contents of the addresses from 000000H to 1FFFFFH are copied to the addresses from 200000H to 3FFFFFH, while the contents of the addresses from 200000H to 3FFFFFH are copied to the addresses from 000000H to 1FFFFFH. If the result of the check 64 shows that the preserved area is the preservation area A 101, the replacement with the preservation area A at step 65 is not executed. At step 66 for restoring the contents of the display memory, the contents of the display memory in the preservation area A 101 are read out and written into the display memory 4. At step 67 for restoring the contents of the I/o registers in the peripheral devices, values in the I/O registers of the peripheral devices including the display controller 3 and the keyboard controller 13 are read out from the preservation area A 101 and written into the I/O registers of the display controller 3, the keyboard controller 13 and so on, respectively. Further, at step 68 for restoring the contents of the CPU registers, the contents of the registers in the CPU 1 preserved in the preservation area A 101 are written into the respective registers in the CPU 1. As a result of the above described processing, a work state specified by the user can be reproduced within one or a plurality of work states previously interrupted by a power-off executed by the interrupt. Incidentally, part of preserved data for the work states may be stored in the SRAM 21 not in the main memory 2.

While the above embodiment shows an example where the user can arbitrarily specify a preserved work name, a user's ID may be used as the preserved work name. The use of the user's ID can prevent a work state preserved by a particular user from being reproduced by another user who turns on the information processing apparatus, thereby making it possible to realize a resume function that has excellent security features. Also, the user's ID may be combined with a name arbitrarily specified by the user such that each user is allowed to preserve and reproduce a plurality of work states. This alternative can be achieved by preserving the user's ID in place of a preserved work name together with a work state or preserving a work state in a preservation area corresponding to the user's ID. In the latter case, the information processing apparatus requires the user to input the user's ID when the power source is turned on. Then, it is checked whether or not a work state corresponding to the inputted user's ID exists in the memory. If the check result shows that a work state corresponding to the input user's ID exists, the user is further requested to input a preserved work name, followed by the reproduction of the work state from a preservation area specified by the user in a similar manner. Thus, work states of a plurality of users can be simultaneously preserved, and when an associated user turns on the power source, his or her own work state can be reproduced without causing any security problems.

Figure 4:
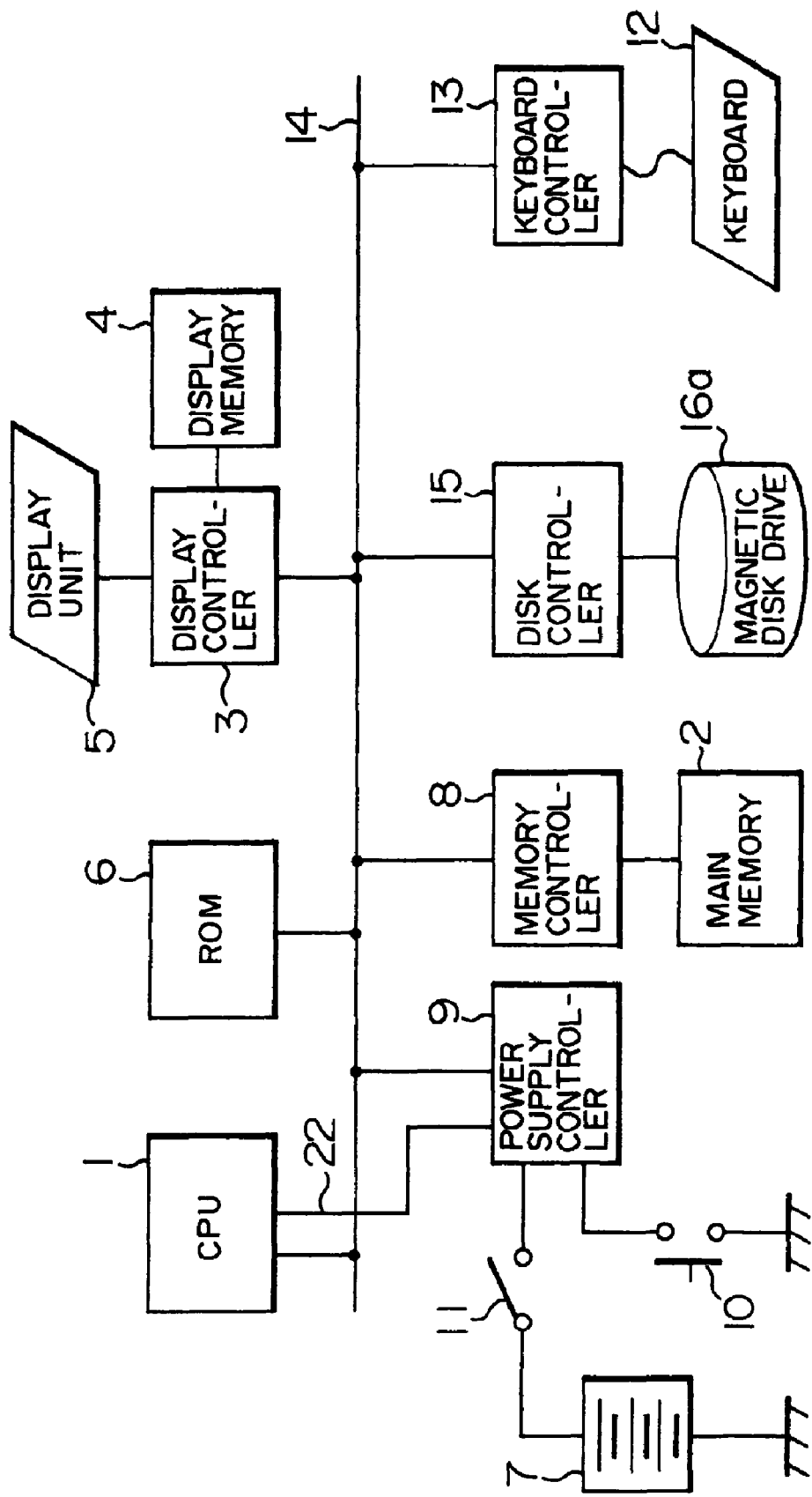
FIG. 4 is a block diagram illustrating the configuration of an information processing apparatus according to a second embodiment of the present invention.
Figure 6:
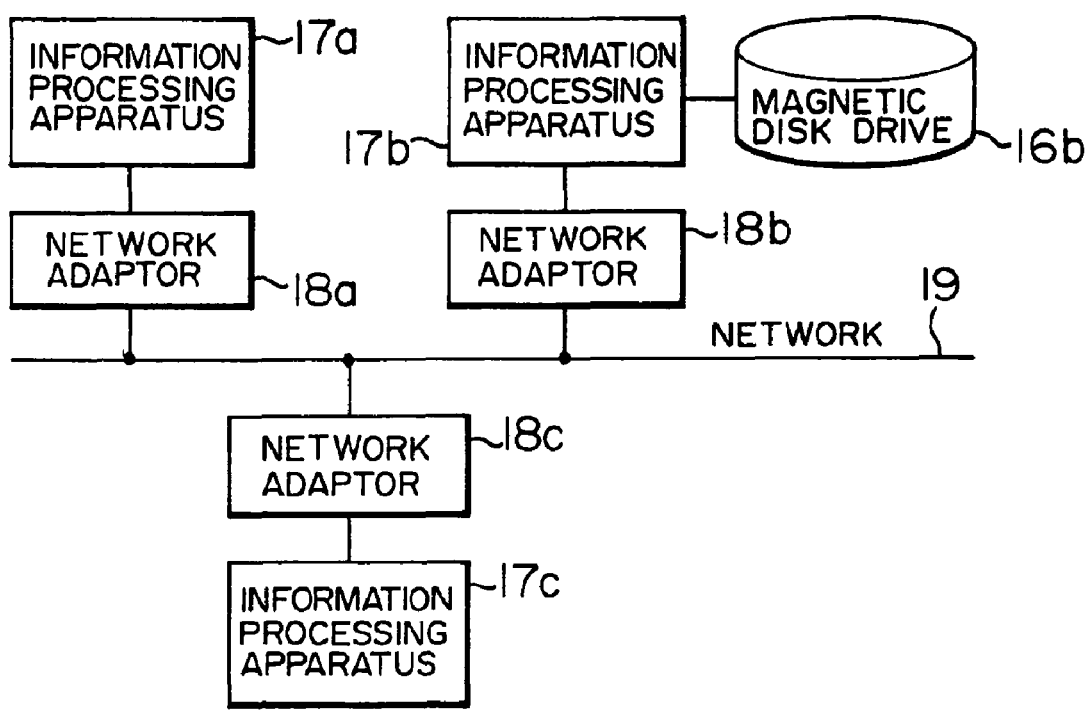
FIG. 6 is a block diagram illustrating the configuration of a network according to a third embodiment of the present invention.

Next, a second embodiment of the present invention will be described with reference to FIGS. 4 and 6. FIG. 4 illustrates an exemplary configuration of an information processing apparatus according to the second embodiment. The second embodiment differs from the first embodiment shown in FIG. 2 in that a magnetic disk drive 16a and a disk controller 15 for controlling the magnetic disk drive 16a are provided and the power supply line 20 for back up and the SRAM 21 are removed. In this embodiment, work states which are preserved in the main memory 2 in the first embodiment are preserved in the magnetic disk drive 16a.

Figure 5:
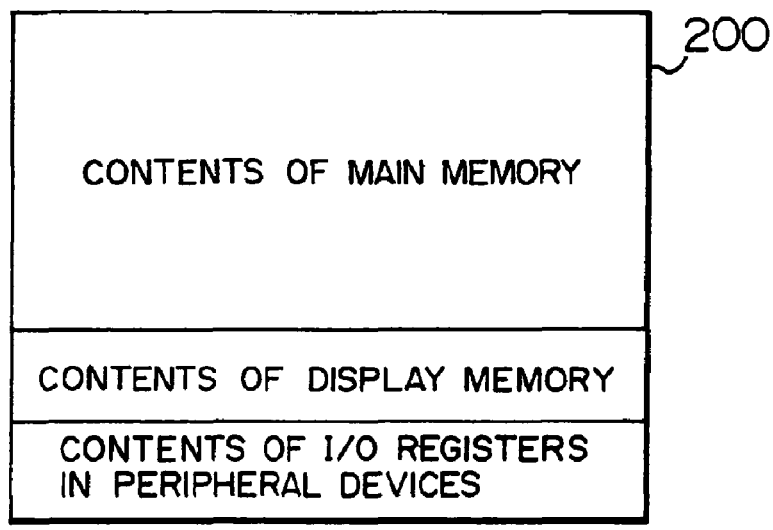
FIG. 5 illustrates an example of a format of a work state preserving file in the second embodiment of the present invention.

In this event, the contents of the main memory 2 are also saved in the magnetic disk drive 16a. Specifically, data in respective preservation areas in the main memory 2 in the first embodiment are preserved in the magnetic disk drive 16a as a work state preservation file 200. FIG. 5 illustrates an example of a format of the work state preservation file 200. The work state preservation file 200 may be designated a file name which includes a preserved work name specified by the user or a user's ID such that a plurality of work states of one or plural users can be preserved and reproduced when an associated user turns on the power source without causing any security problem. Additionally, in the second embodiment, since work states are preserved in the magnetic disk drive 16a which does not require a back-up operation by a battery, the main memory 2 need not be backed up by a battery, and many work states can be preserved over a long term.

Next, a third embodiment of the present invention will be described below with reference to FIG. 6. A network shown in FIG. 6 comprises a first information processing apparatus 17a which the user operates using application software and so on; a second information processing apparatus 17b provided with a magnetic disk drive 16b; and a third information processing apparatus 17c having the same architecture as the first information processing apparatus 17a. The magnetic disk drive 16b can be accessed from the first information processing apparatus 17a and the third information processing apparatus 17c through network adapters 18a, 18b and 18c, and a network transmission line 19.

The third embodiment differs from the second embodiment in that a work state preservation file 200 of the first information processing apparatus 17a is not stored in an internal storage unit of the information processing apparatus 17a but in the second information processing apparatus 17b connected thereto through the network. The third embodiment features that the first information processing apparatus 17a does not necessarily require a battery back-up function for the main memory 2 to preserve work states and the magnetic disk drive 16a which need not be backed up by a battery. Also, since it is not necessary to turn off the second information processing apparatus 17b in association with the first information processing apparatus 17a, a main memory or the like in the second information processing apparatus 17b may be used in place of the magnetic disk drive 16*b* if the second information processing apparatus 17*b* is not turned off.

In this case, when the first information processing apparatus 17*a* is turned off, a work state of the first information processing apparatus upon turning off the power source is transferred to the second information processing apparatus 17*b* connected thereto through the network. The second information processing apparatus 17*b*, responsive to this, stores and preserves the transferred work state in the main memory thereof or in the magnetic disk drive 16*b*. In this manner, the first information processing apparatus 17*a* can realize the resume function without its main memory being backed up by a battery. In addition, a work state preserved in the second information processing apparatus 17*b* may be reproduced by the third information processing apparatus 17*c*. Therefore, a work state may be preserved by the first information processing apparatus 17*a* and reproduced from the third information processing apparatus.

Figure 7:
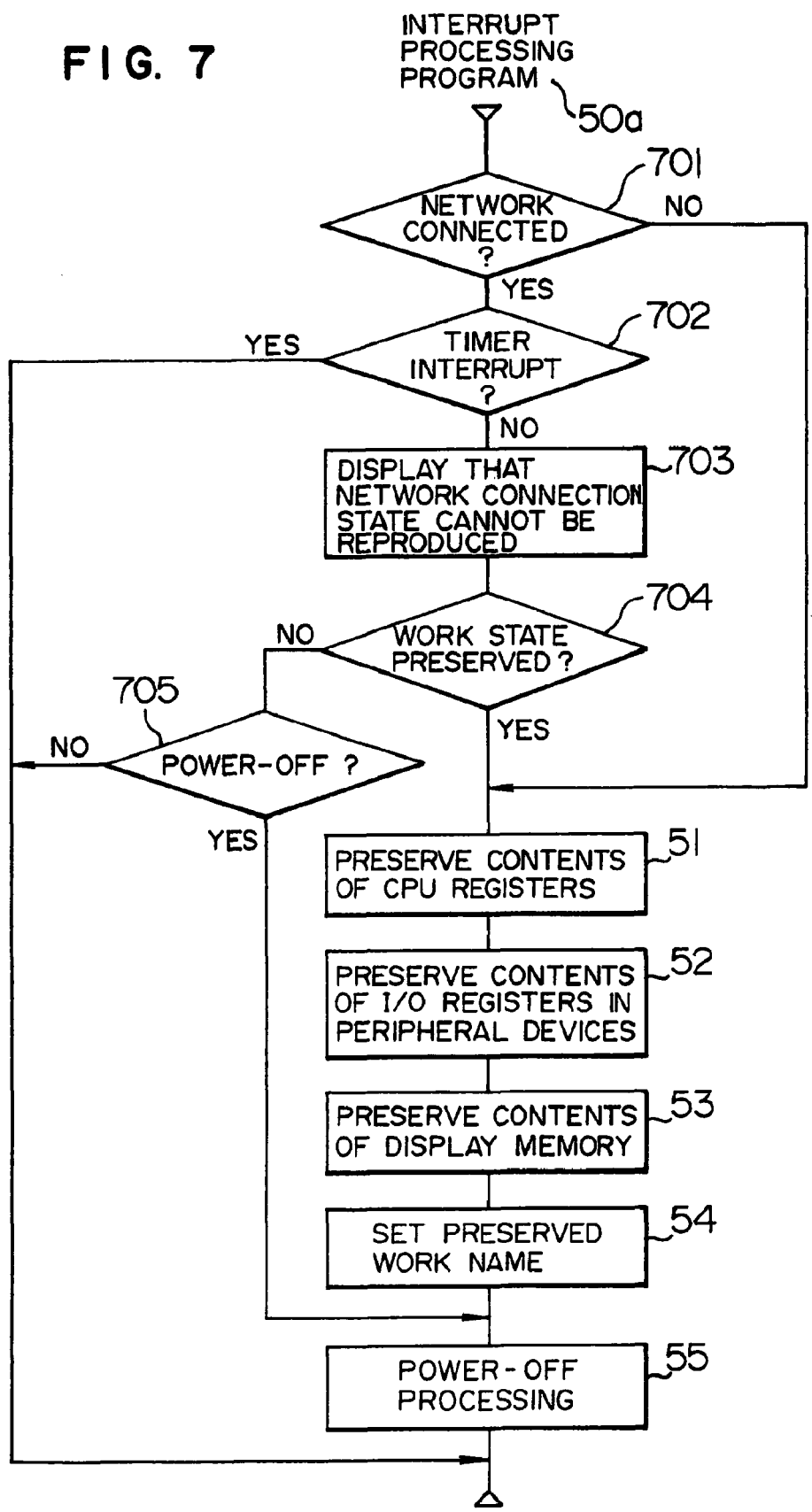
FIG. 7 is a flow chart illustrating an example of an interrupt program for performing a work state preservation in a fourth embodiment of the present invention.

Next, a fourth embodiment of the present invention will be described below with reference to FIG. 7. The fourth embodiment provides an interrupt processing program 50*a* by adding steps 701, 702, 703, 704 and 705 as shown in FIG. 7 to the interrupt processing program explained in connection with FIG. 3 in the first embodiment in order to solve a problem that a network connection state upon preserving a work state cannot be correctly reproduced when the work state is to be reproduced. First, at step 701, it is checked whether an associated information processing apparatus is connected to a network. If the information processing apparatus is not connected to the network, the program proceeds to the step 51 for preserving the contents of the CPU registers to subsequently preserve a work state and turn off the power source in the completely same manner as the first embodiment. On the other hand, if the information processing apparatus in question is connected to the network, it is checked at step 702 whether the interrupt processing program 50*a* has been started by a timer interrupt due to the fact that no input had been given from a keyboard 12 for a predetermined amount of time. If the timer interrupt has caused the interrupt processing program 50*a* to start, the interrupt processing program 50*a* is terminated without executing subsequent steps. If the timer interrupt is not the cause, the user is informed at step 703 that a network connection state cannot be reproduced, and then at step 704 the user is asked whether or not the work state should be preserved. An example of a displayed screen for this inquiry is shown in FIG. 15. If the user answers that the work state will not be preserved, the user is again asked at step 705 whether or not the power source is turned off. If the user answers that the power source will be turned off, power-off processing at step 55 is executed, and otherwise the interrupt processing program 50*a* is terminated without performing other processing. If the user answers at step 704 that the work state should be preserved, the steps 51 to 55 are executed to perform the preservation of the work state and the power-off processing in the completely same way as the first embodiment.

As described above, when the information processing apparatus is connected to the network, a work state is not preserved by the timer so as to prevent the preservation operation from being automatically executed for a network connection state which is rendered unreproducable due to the user who has interrupted the operation of the information processing apparatus for a while. Further, when the user is going to manually execute the work state preservation, the user is informed that the network connection state cannot be reproduced, whereby the user is led to perform appropriate processing.

Figure 10:
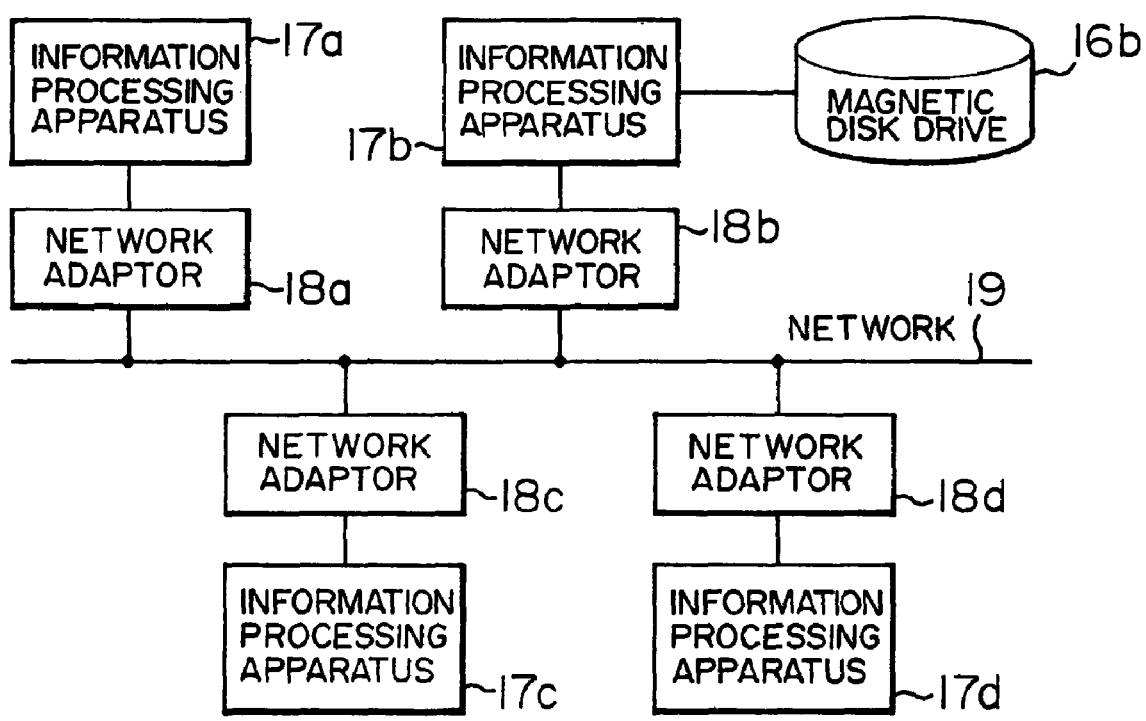
FIG. 10 is a block diagram illustrating the configuration of a network according to the fifth embodiment of the present invention.

Next, a fifth embodiment of the present invention will be described with reference to FIG. 10. The configuration of a system according to the fifth embodiment shown in FIG. 10 comprises a first information processing apparatus 17*a* which the user operates using application software and so on; a second information processing apparatus 17*b* provided with a magnetic disk drive 16*b* for acting as a server; a third information processing apparatus 17*c* having the same architecture as that of the first information processing apparatus 17*a*; and a fourth information processing apparatus 17*d* having an architecture different from that of the first information processing apparatus 17*a*. The magnetic disk drive 16*b* is accessible from the first, third and fourth information processing apparatus 17*a*, 17*c* and 17*d* through network adapters 18*a*, 18*b*, 18*c* and 18*d* and a network transmission line 19. The hardware configuration of the information processing apparatus of the fifth embodiment is assumed to be the same as that of the first embodiment shown in FIG. 2. Now, the operation of the system will be explained in connection with preservation and reproduction of a work state in this order.

Figure 8:
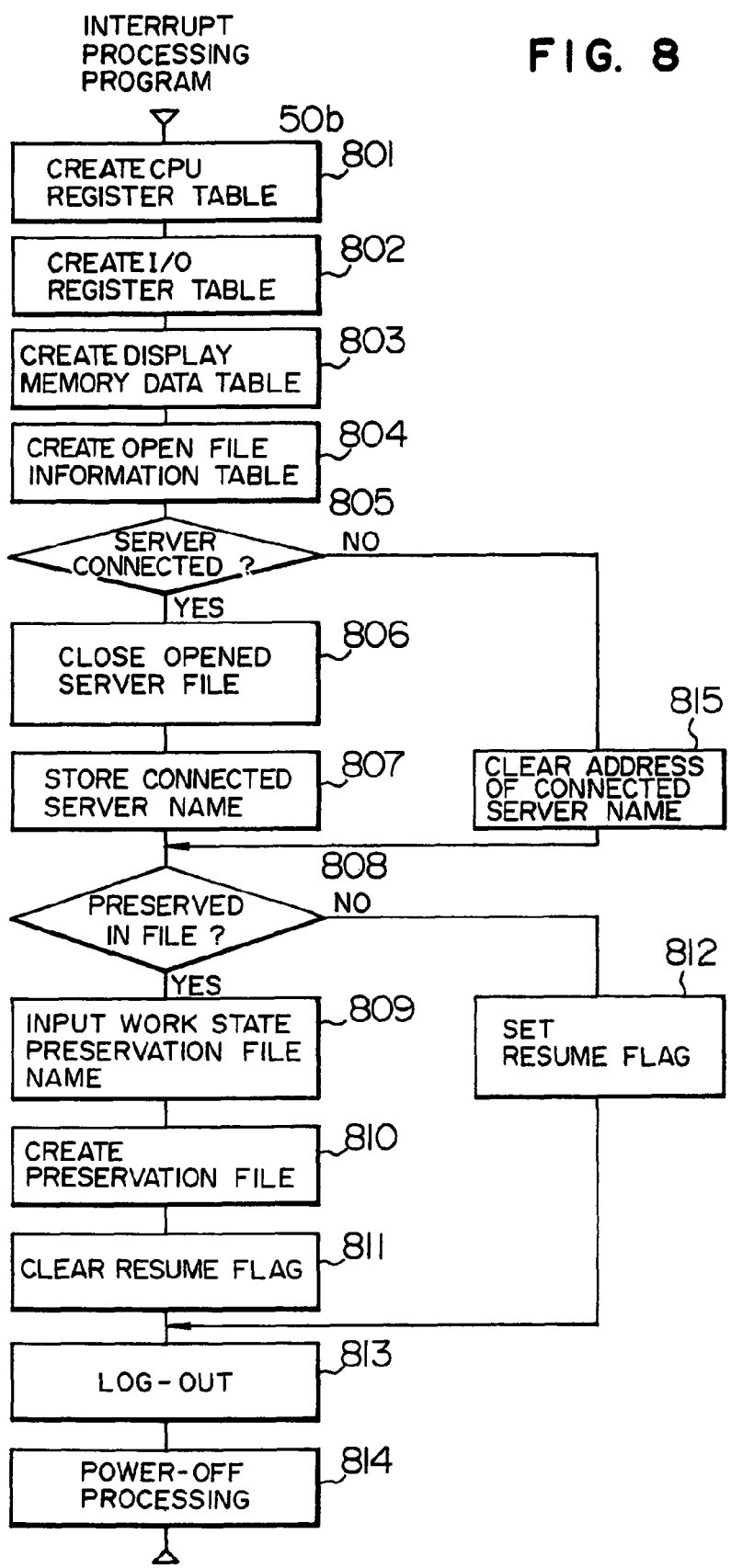
FIG. 8 is a flow chart illustrating an example of an interrupt program for performing work state preservation in a fifth embodiment of the present invention.
Figure 11:
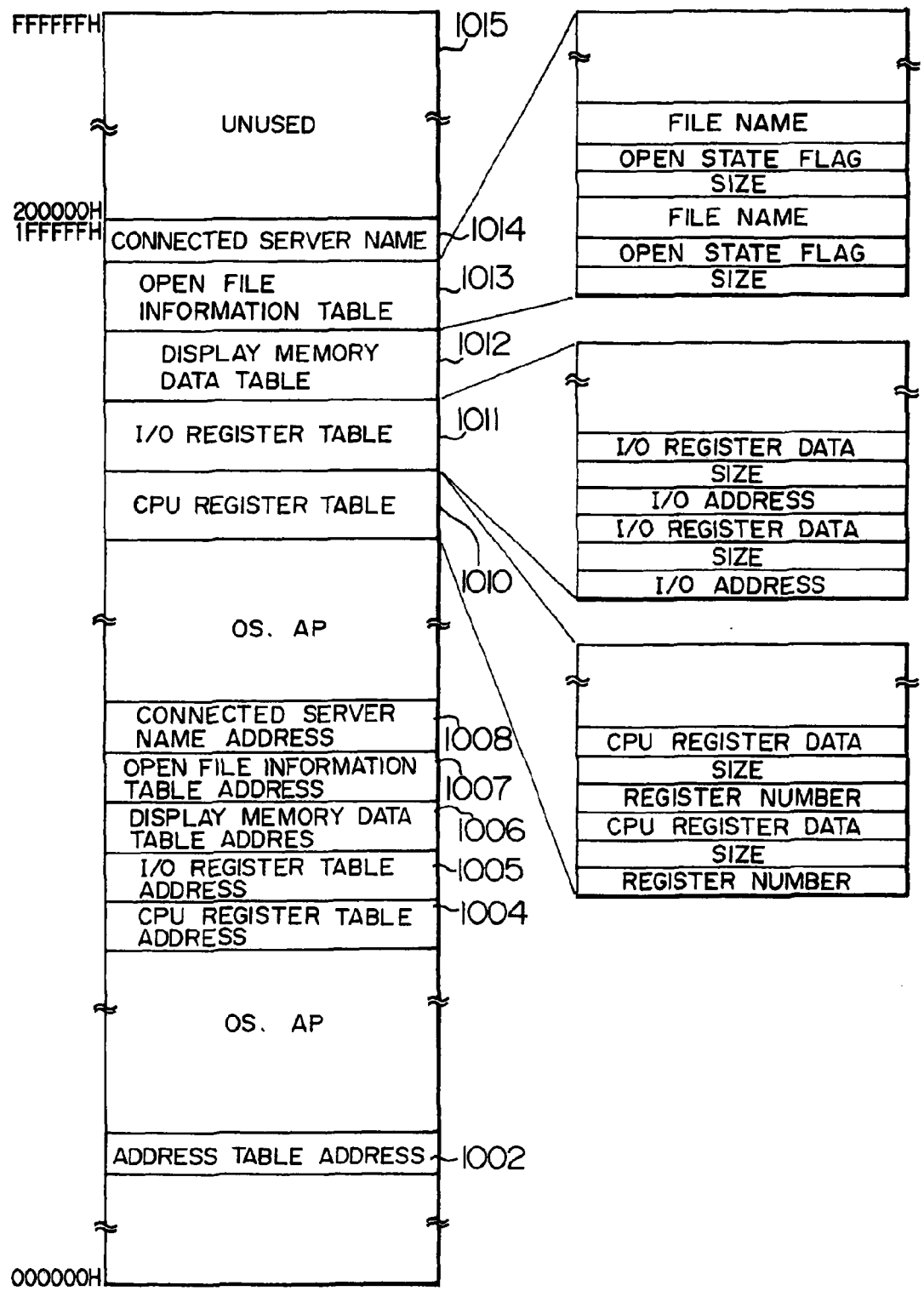
FIG. 11 illustrates a memory map of a main memory in the fifth embodiment of the present invention.

A power supply controller 9 of the information processing apparatus 17*a* monitors a state of a power supply switch 10 for the resume function, a state of a battery 7 and a keyboard controller 13. If the power supply controller 9 detects, in power-on state, that a user depresses the power supply switch 10 for resume function, that the battery 7 has been used up, or that no input has been provided from a keyboard 12 for a predetermined time period, the power supply controller 9 informs a CPU 1 of the occurrence of the state as mentioned above through an interrupt signal line 22. The CPU 1, upon detecting the interrupt signal, executes an interrupt processing program 50*b* which has previously been written in a RON 6. The processing executed by the interrupt processing program 50*b* will be explained below with reference to a flow chart of FIG. 8 and a memory map of FIG. 11. First, at step 801, the contents of registers in the CPU 1 are stored in a CPU register table 1010. The CPU register table 1010 is composed of data sets each consisting of a register number, a size indicative of a number of bytes of a related register, and CPU register data indicative of the contents of the register, which are repeated by a number equal to the number of the registers, as shown in FIG. 11. Stored in a CPU register table address 1004 is the start address of the CPU register table address 1010.

Next, at step 802, the I/O registers are read out, and an I/O register table 1011 and an I/O register table address 1005 shown in FIG. 11 are stored in the main memory 2. The I/O register table 1011 is composed of data sets each consisting of an I/O address, a size indicative of a number of bytes of the register, and I/O register data indicative of the contents of the register, which are repeated by a number equal to the number of the registers. Stored in the I/O register table address 1005 is the start address of the I/O register table address 1011.

Next, the contents of the display memory 4 are read out and stored in a display memory data table 1012 at step 803. The start address of the display memory data table 1012 is stored in a display memory table address 1006.

At step 804, an open file information table 1013 is created. The open file refers to a file being used by the OS for the operation of the OS itself or by a request from application software. The state of an open file is one of read-only, write-only and read/write states. The open file information table 1013 created herein is such one that includes information sets each consisting of the name of an opened file, a state of the opened file and the number of bytes of the file name and a flag indicative of the state, which are repeated by a number equal to the number of opened files. The start address of the open file information table 1013 is stored in an open file information table address 1007.

Next, it is checked at step 805 whether the first information processing apparatus 17a in which this program is being executed is physically and logically connected to the second information processing apparatus 17b acting as a server through the network. If the check result shows that the first information processing apparatus 17a is connected to the second information processing apparatus 17b, subsequent steps 806, 807 are executed, and otherwise step 815 is executed. At step 806, an opened server file is closed referring to the open file information table 1013 created at step 804, and at step 807 a logical name of the second information processing apparatus 17b in the network is stored in the main memory 2 as a connected server name 1014 as shown in FIG. 11. At this time, the stored address of the connected server name 1014 in the main memory 2 is stored in the main to memory 2 as a connected server name address 1008. On the other hand, at step 815, the connected server name address 1008 is set to "0" which indicates that the first information processing apparatus 17a is not connected to the server.

Figure 12:
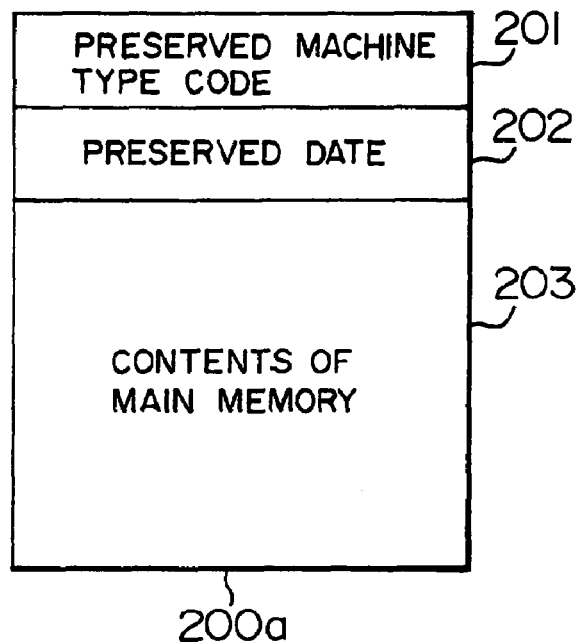
FIG. 12 illustrates an example of a format for a work state preservation file in the fifth embodiment of the present invention.

At step 808, the user is asked whether a work state is preserved in a file or in the main memory backed up by a battery. If the user selects the preservation of the work state in a file, the user is prompted to input the name of a file in which the work state is to be preserved at step 809. FIG. 16 illustrates an example of a screen on which the Inquiries of the steps 808, 809 are displayed. Next, a work state preservation file 200a designated by the input file name is created at step 810. At this time, in addition to data contents 203 in the main memory 2 shown in FIG. 11, a preserved machine type code 201 and a preservation executed date 202 are also stored in the work state preservation file 200a. The structure of the work state preservation file 200a is illustrated in FIG. 12. Turning back to the flow chart of FIG. 8, a resume flag register provided in the power supply controller 9 is set to a value indicating that the work state is not preserved, when it is to be preserved in the file (step 811). Conversely, when the work state is not to be preserved in the file, the resume flag register is set to a value indicating that the work state has been preserved (step 812). Afterward, log-out is executed to disconnect the information processing apparatus 17a from the network at step 813, and power-off processing is performed at step 814, followed by the termination of the interrupt processing program 50b for preserving a work state.

Figure 9:
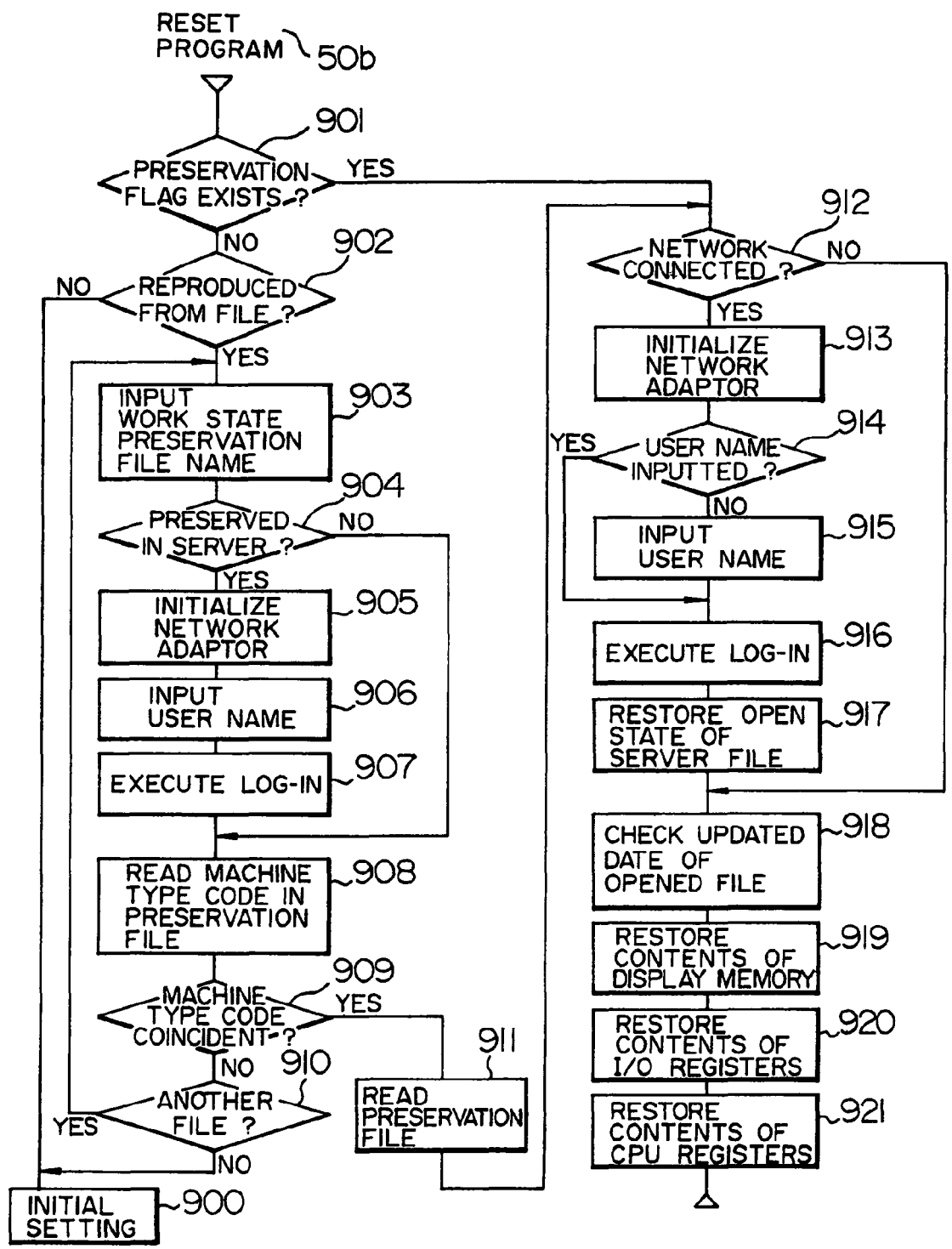
FIG. 9 is a flow chart illustrating an example of a reset program for performing work state reproduction in the fifth embodiment of the present invention.

Next, explanation will be given of the operation when a work state is reproduced. When the power supply controller 9 detects that the user has again depressed the power supply switch 10 for the resume function in power-off state, the power supply controller 9 starts supplying all devices with electric power. This enables the CPU 1 to first execute a reset program 60b stored in the ROM 6. FIG. 9 illustrates a flow chart of the reset program 60b. The reset program first reads out the value set in the resume flag register in the power supply controller 9 at step 901 to check whether a work state was stored in the main memory 2 upon turning off the power source. If the check result shows that a work state was preserved in the main memory 2, the control is transferred to step 912. Otherwise, step 902 is executed. At step 902, the user is asked whether or not the work state is to be reproduced from the file. If the user answers that the work state will not be reproduced from the file, the control is transferred to step 900 for initial setting where the information processing apparatus is initialized and the OS is started. If the user answers at step 902 that the work state will be reproduced from the file, the user is prompted to input the name of the work state preservation file 200a which is to be used. An example of a displayed screen at this time is shown in FIG. 16. Next, at step 904, the input name of the work state preservation file 200a is analyzed to check whether this is a file on the information processing apparatus 17b which is used as a server. If the check result shows that it is not a file on the information processing apparatus 17b, the control is transferred to step 908. Conversely, if that file is a file on the information processing apparatus 17b, the network adapter 18a is initialized at step 905, the user is prompted to input the user name and a password at step 906, and log-in is executed to the information processing apparatus 17b using the user name and the password at step 907 to achieve a logical connection. An example of a display on the screen at step 906 is shown in FIG. 17. Next, the work state preservation file 200a is referenced at step 908 to read out the preserved machine type code 201 stored when the work state was preserved. Then, it is checked at step 909 whether or not the preserved machine type code 201 coincides with the machine type code of the information processing apparatus which is executing this program. As has been already described, in this embodiment, while the information processing apparatus 17a and the information processing apparatus 17b have the same architecture and the same machine type code, the information processing apparatus 17d has a different architecture and a different machine type code from the information processing apparatus 17a, 17b. Therefore, assuming that a work state was preserved on the information processing apparatus 17a, if this work is to be reproduced on the information processing apparatus 17a or 17c, the determination at step 909 indicates "coincidence." On the other hand, if the work state is reproduced on the information processing apparatus 17d, the determination is "dissidence." If "dissidence" is indicated by the check result, the user is informed of the difference in machine type as well as inquired whether or not another work state preservation file 200a is used at step 910. A screen for this inquiry is shown in FIG. 18. If the user answers that another work state preservation file 200a is used, the returns to step 903. If the user answers that file is used, the control is transferred to the initialization step 900 for initializing the information processing apparatus and starting the OS without performing the work state reproducing processing. If "coincidence" is indicated by the determination result at step 909, the main memory contents 203 in the work sate preservation file 200a are read out and stored in the main memory 2. As a result, the contents of the main memory 2 shown in FIG. 11 are reproduced. Next, at step 912, the contents of the connected server name address 1008 are checked, and if "0" is set therein, it is determined that the information processing apparatus 17b was not connected to the network when the work state was preserved, thus transferring the control to step 918. If the contents of the connected server name address 1008 is not "0," it is determined that the information processing apparatus 17b was connected to the network, and the initialization of the network adapter 18a is executed at step 913. Next, whether the user name was input is checked at step 914. If the user name was not input, the user is prompted to input the user name and a password at step 915, and log-on to the information processing apparatus 17b is executed at step 916 using the input user name and the password. Next, the open file information table 1013 on the main memory 2 is referenced at step 917. If the table contains a file on the information processing apparatus 17b used as a server, an open state of that file is reproduced. At step 918, the latest modified date of the file registered in the open file information table 1013 is checked and compared with the preserved date 202 of the work state preservation file 200a. If the latest modified date is later than the preserved date 202, there is a possibility that the contents of the file were modified after the work state had been preserved. Therefore, the file cannot be used as it is so that a message as shown in FIG. 19 is displayed to draw the user's attention. Next, the contents of the display memory data table 1012 are stored in the display memory 4 at step 919, and the I/O register table 1011 is referenced at step 920, thereby reproducing the contents of the respective I/O registers. Finally, at step 921, the CPU register table 1010 is referenced to reproduce the contents of the respective registers in the CPU 1. Upon termination of the step 921, the reproduction of the work state is completed.

In the fifth embodiment, when the information processing apparatus has been connected to the network upon preserving a work state, the connection to the network and log-in operation are automatically performed upon reproducing the work state, thereby making it possible to reproduce the work state including the connection state to the network. Also, even when a work state is preserved while a file on another information processing apparatus used as a server is open, this open state can also be reproduced upon reproducing the work state, thereby correctly reproducing the work state. Further, when an open state of a file is to be reproduced, the work state preserved date is compared with the latest modified date of the file, and if the latest modified date is later, the user is informed that the contents of the file have been modified after the work state was preserved, whereby the user can effect necessary proceedings to the file. Also, the machine type code 201 of an information processing apparatus on which a work state was preserved is stored in the work state preservation file 200a and is compared, upon reproducing the work state, with the machine type code of an information processing apparatus on which the work state is to be reproduced. If these two codes are different, the reproduction of the work state is cancelled, thereby preventing troubles such as run-away of a program which may possibly occur when the work state is reproduced on an information processing apparatus of a different type. Since the user is allowed to select whether the work state is preserved in the main memory backed up by a battery or in the work state preservation file 200a, an optimal work state preserving method can be selected according to a particular situation, such as whether or not the information processing apparatus is connected to the network, whether high speed preservation and reproduction are enabled only for a single set of work state by the main memory 2 backed up by a battery, and so on.

Figure 13:
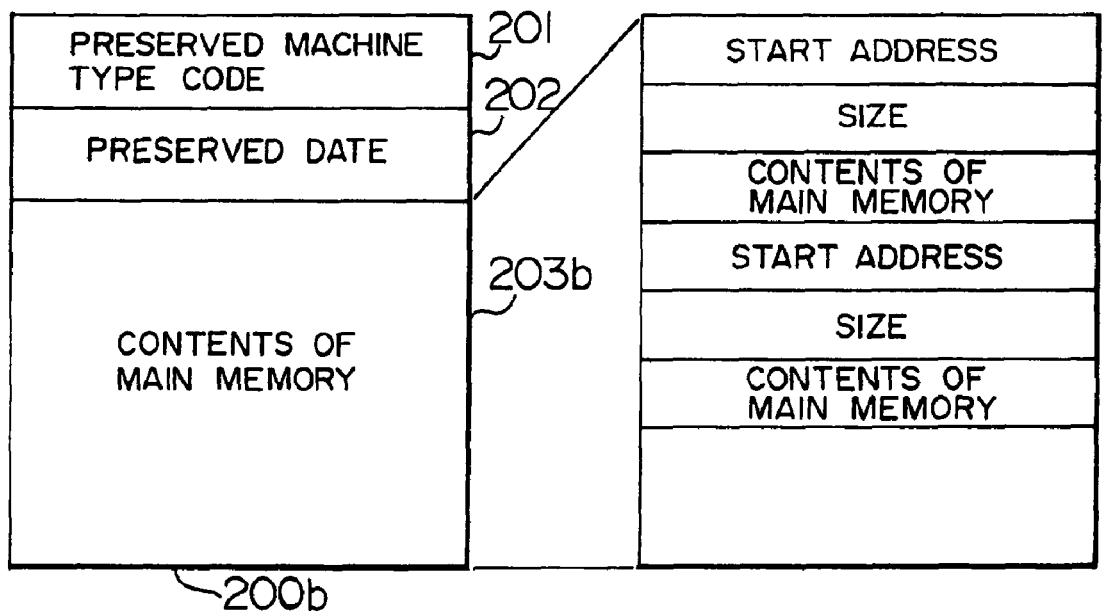
FIG. 13 illustrates an example of a format for a work state preservation file in a sixth embodiment of the present invention.

Next, a sixth embodiment of the present invention will be described below with reference to FIG. 13. A work state preservation file 200b of FIG. 13 shows another example of the work state preservation file 200a in the fifth embodiment. While the contents of the main memory 2 are stored as they are as the contents 203 of the main memory in the fifth embodiment, contents of memory blocks being used in the main memory 2 are solely stored as contents 203b of the main memory in the sixth embodiment. Specifically, based on memory using situation data proposed by the OS, the start address, block size and contents of the main memory are stored for every memory block in use. This removes the necessity of storing data in unused portions of the main memory, thereby reducing the file size of the work state preservation file 200b, decreasing the amount of the magnetic disk 16a or 16b used for storing the work state preservation file 200b, and shortening a time necessary for preservation and reproduction. For storing the contents of the main memory 2 into the work state preservation file 203b, a data compress algorithm or the like may be used to reduce the file size of the work state preservation file 203b other than the above-stated method which imitatively stores memory blocks in use.

Figure 20:
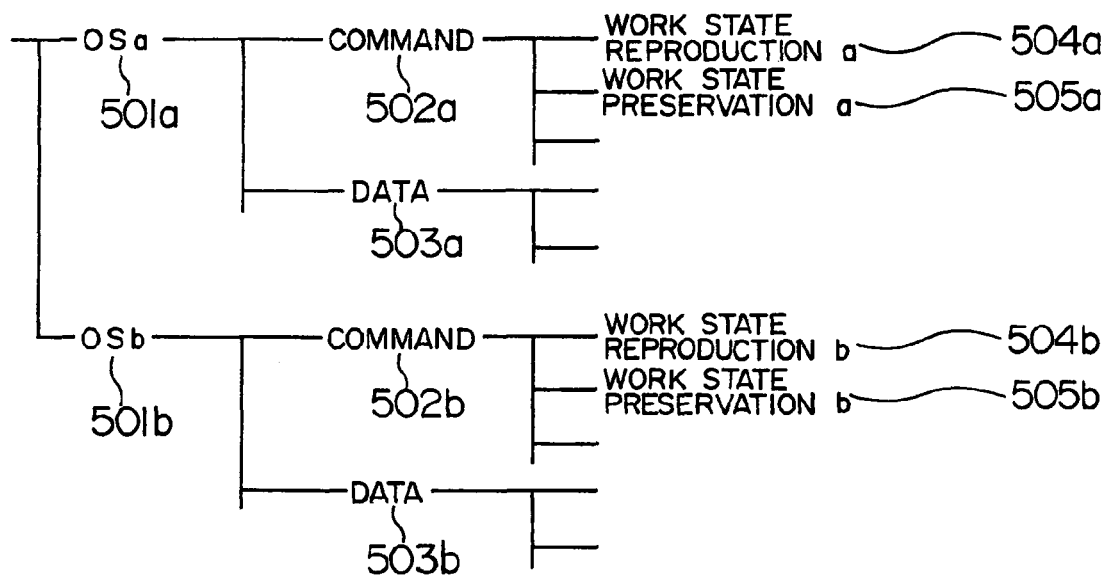
FIG. 20 illustrates an example of a file directory according to a seventh embodiment of the present invention.
Figure 21:
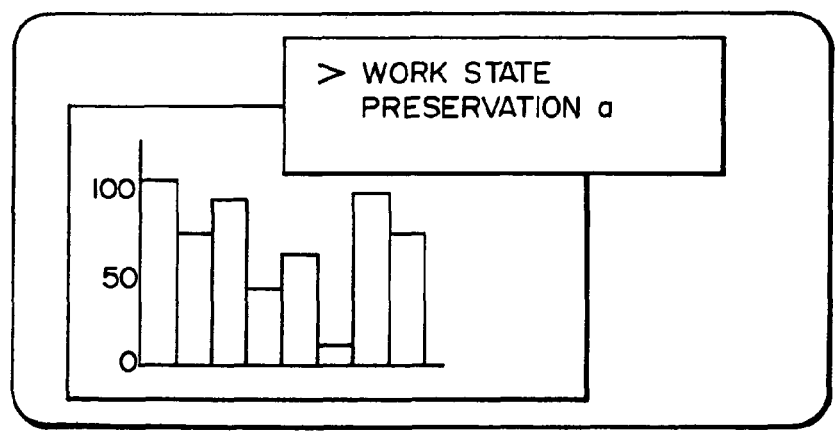
FIG. 21 illustrates an example of a screen for inputting a work state preservation command in the seventh embodiment of the present invention.

Next, a seventh embodiment of the present invention will be described below. In this embodiment, the interrupt program for preserving a work state and the reset program for reproducing a work state, which are stored in the ROM 6 in the foregoing embodiments, are stored in a storage unit as program files which can be executed as commands from the OS. FIG. 20 illustrates a file directory of a magnetic disk 16a employed in an information processing apparatus 17a of the seventh embodiment. Stored in the file directory are two kinds of OS's: OSa and OSb. OSa and OSb are different in command program type so that a common program file cannot be used. Commands and data for the respective OS's are stored under the directories of commands 502a, 502b and the directories of data 503a, 503b, respectively. A work state reproduction program and a work state preservation program for OSa are stored in the directory of the command 502a as files named "work state reproduction a" 504a and "work state preservation a" 505a, respectively. A work state reproduction program and a work state preservation program for OSb are stored in the directory of the command 502b as files named "work state reproduction b" 504b and "work state preservation b" 505b, respectively. Processing executed by the work state preservation a 505a and the work state preservation b 505b may be the same as the processing procedures of the foregoing interrupt programs 50, 50a, 50b and so on. Likewise, processing executed by the work state reproduction a 504a and the work state reproduction b 504b may be the same as the processing procedures of the foregoing reset programs 60, 60b and so on. When the user desires to preserve/reproduce a work state, work state preservation/reproduction programs in accordance with the kind of an OS in use are executed as commands. FIG. 21 illustrates an example of a screen in which another window is opened to issue a command for preserving a work state while a graph is being created in a window under the control of OSa.

According to the seventh embodiment, since the work state preservation and reproduction programs can be executed as command programs, information processing apparatus having no power supply mechanism or RON programs for the resume function can also realize the resume function. Since work state preservation and reproduction programs can be selected in accordance with the kind of a used OS, the preservation and reproduction of a work state can be easily achieved even when a plurality of OS's are used.

While the foregoing embodiments show examples where a magnetic disk drive is employed as a storage unit which need not be backed up by a battery, an optical disk drive or the like may be replaced therewith as long as it does not require battery back-up. The display unit may be a CRT or the like other than the liquid crystal display 5. Further, a work state may be saved and reproduced not only when the power source is turned off and again turned on, but also at an arbitrary timing at which the user desires to interrupt or resume a work.

Next, an eighth embodiment of the present invention will be described with reference to FIGS. 22-27.

Figure 23:
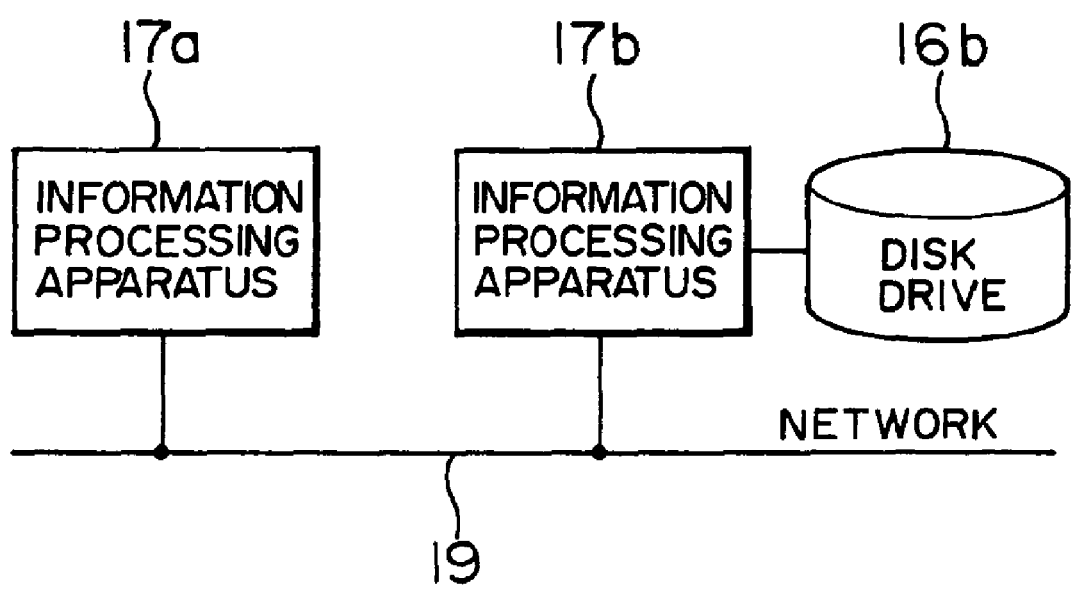
FIG. 23 is a block diagram illustrating the configuration of an information processing system according to one embodiment of the present invention.

FIG. 23 illustrates the configuration of an information processing system employing information processing apparatus according to one embodiment of the present invention. In this information processing system, an information processing apparatus 17a is permitted to read from and write into a disk drive 16b connected to an information processing apparatus 17b, as if it were a disk unit connected thereto, by establishing a logical connection with the information processing apparatus 17b through a network 19. While the logical connection is maintained between the information processing apparatus 17a and 17b, the information processing apparatus 17b periodically transmits a connection acknowledgement request frame to the information processing apparatus 17a at appropriate time intervals, and the information processing apparatus 17a returns a connection acknowledgement response frame responsive to the connection acknowledgement request frame, thereby maintaining the logical connection therebetween. Alternatively, the information processing apparatus 17a periodically transmits a connection acknowledgement notice frame to the information processing apparatus 17b at appropriate time intervals to maintain the logical connection. If the connection acknowledgement response frame is not returned, or if the connection acknowledgement notice frame is not transmitted, the information processing apparatus 17b assumes that the information processing apparatus 17a is in a failure state and releases the logical connection.

Figure 22:
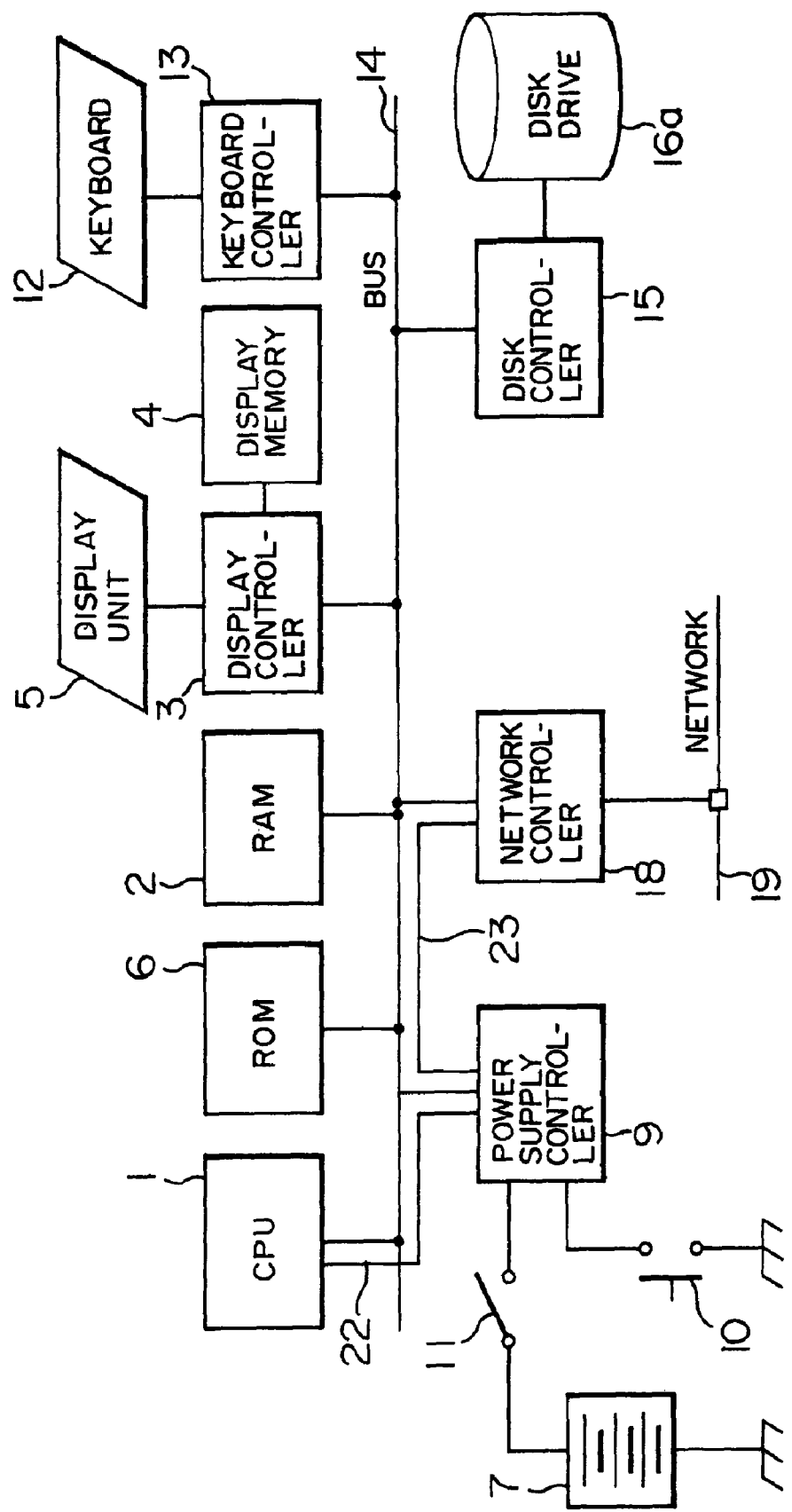
FIG. 22 is a block diagram illustrating the configuration of an information processing apparatus according to an eighth embodiment of the present invention.
Figure 24:
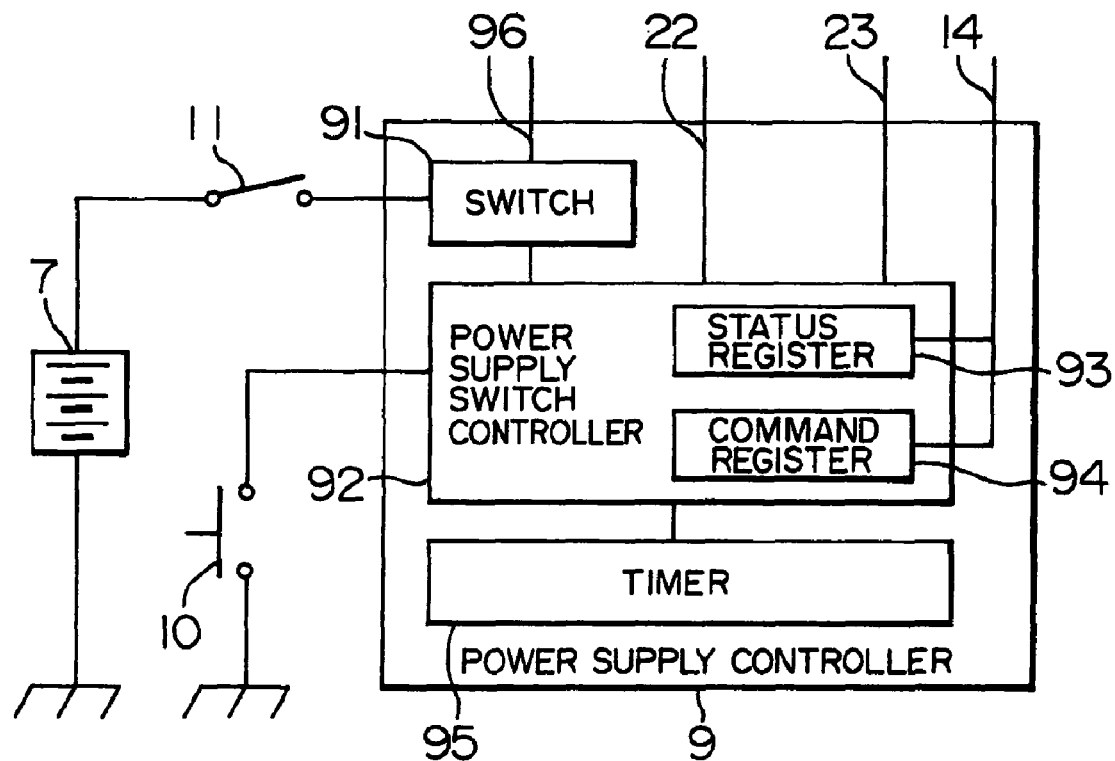
FIG. 24 is a schematic diagram illustrating the configuration of a power supply controller used in the information processing apparatus according to the eighth embodiment of the present invention.

FIG. 22 illustrates the configuration of an information processing apparatus 17a implementing the eighth embodiment of the present invention. In the drawing, reference numeral 23 designates a power supply control signal line from a network controller 18 to a power supply controller 9. FIG. 24 illustrates in greater detail the configuration of the power supply controller 9. The power supply controller 9 comprises a switch 91 for turning on and off electric power supplied to respective sections of the controller 9; a power supply switch controller 92 for controlling the switch 91; a status register 93 for noticing a status of the power supply controller 9 to a CPU 1; a command register 94 for the CPU 1 to instruct the power supply controller 9 of a certain operation; a timer 95 used by the power supply switch controller 9 for timing; and a power supply line 96 for supplying electric power to the respective sections. In the information processing apparatus thus constructed, the resume function according to the present invention operates in the following manner.

First, a procedure of the information processing apparatus 17a in operation for preserving a work state at a certain time and shutting off the power supply will be explained with reference to a sequence diagram of FIG. 25. When the power supply controller 9 detects, 20 while the information processing apparatus 17a is operating, that the power supply switch 10 for resume function is depressed, that the voltage of the battery 7 has decreased below a predetermined value, or that no key input has been provided through the keyboard 12 for a predetermined amount of time, the power supply switch controller 92 generates an interrupt signal to the CPU 1 through the interrupt signal line 22 for requesting the CPU 1 to start necessary processing for turning of f a power source (step 101). The CPU 1, upon receiving the interrupt, starts work state preservation processing (step 102). A method of preserving a work state may be a method of preserving the work state including the contents of the display memory 4 and so on such that the work state is stored in the RAM 2 composed of RAM devices which can be backed up by the battery 7; a method of preserving the work state in the disk drive 16a as a file; a method of preserving the work state as a file in the disk drive 16b connected to the information processing apparatus 17b through the network 19; and so on. The CPU 1, upon completing the preservation of the work state, writes a particular command indicative of the completion of the work state preservation in the command register 94 to inform the power supply switch controller 92 of the completion of the work state preservation processing (step 103). The power supply switch controller 92, when informed of the completion of the work state preservation processing, operates the switch 91 to stop supplying electric power to the respective sections of the information processing apparatus 17a except for the network controller 18, and informs the network controller 18 of the power-off state (step 104). When the network controller 18 receives a frame, it does not immediately notify the CPU 1 but rather it notifies the power supply controller 9. By the foregoing processing, the information processing apparatus 17a preserves the work state and falls into power-off state.

Next explained is a procedure for responding to a connection acknowledgement request frame transmitted from the information processing apparatus 17b when the information processing apparatus 17a has preserved a work state and remains in power-off state.

Figure 26:
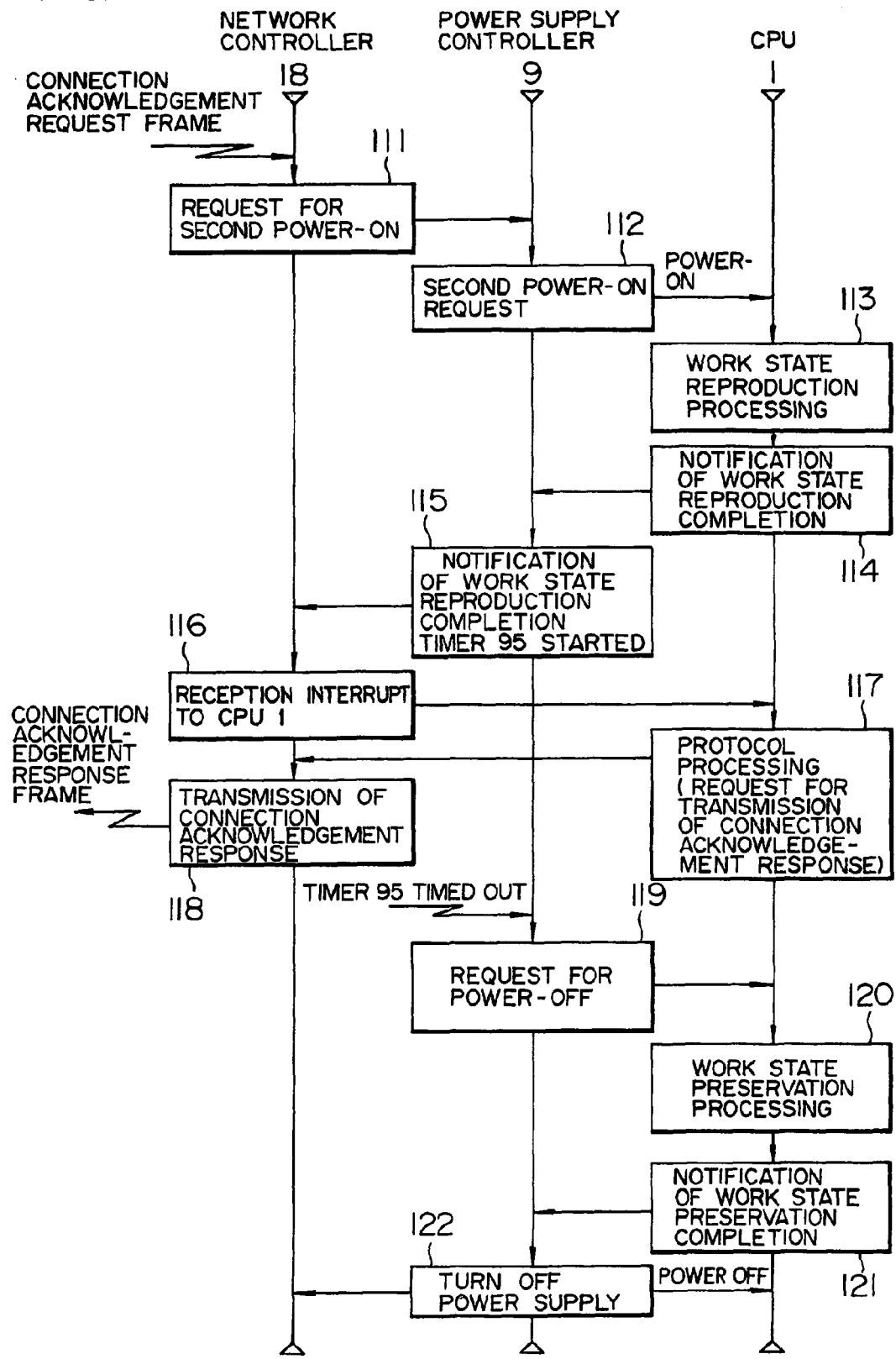
FIG. 26 is a sequence diagram representing processing for receiving a connection acknowledgment request frame in the eighth embodiment of the present invention.

Referring to a sequence diagram of FIG. 26, if a connection acknowledgement request frame is transmitted from the information processing apparatus 17b while the information processing apparatus 17a remains in the power-off state, the network controller 18 reserves a frame reception interrupt to the CPU 1 and issues a power-on request to the power supply controller 9 through the power supply control signal line 23 (step 111). The power-on request is received by the power supply switch controller 92 in the power supply controller 9 which sets in the status register 93 a value indicating that this power-on requires the reproduction of the work state and operates the switch 91 to supply electric power onto the power supply line 96 (step 112). It should be noted however that since this is the second temporary power-on requested by the network controller 18, electric power is not supplied up to the display unit 5. The CPU 1, supplied with electric power, starts reset processing using the program stored in the ROM 6. The CPU 1, after the power-on, first reads the contents of the status register 93 to recognize the necessity of the reproduction of the work state and starts the work state reproduction processing (step 113). Upon completing the reproduction of the work state, the CPU informs the power supply controller 9 of the completion of the work state reproduction by writing a particular command into the command register 94 and goes on with processing from the reproduced work state at the power-off time (step 114). The power supply controller 9, when informed of the completion of the work state reproduction processing, informs the network controller 18 of the same, and starts the timer 95 (step 115). The network controller 18, when informed of the completion of the work state reproduction processing, now issues the reserved frame reception interrupt to the CPU 1 (step 116). Then, the CPU 1, upon receiving the frame reception interrupt, starts protocol processing. In this processing, since the received frame is a connection acknowledgement request frame from the information processing apparatus 17b, the CPU 1 requests the network controller 18 to transmit a connection acknowledgement response frame (step 117) The frame transmission request from the CPU 1 causes the network controller 18 to transmit the connection acknowledgement request frame to the information processing apparatus 17b (step 118). Afterward, when the timer 95 started at step 115 expires, the power supply switch controller 92 is so notified and responsively generates an interrupt to the CPU 1 through the interrupt signal line 22 for requesting the CPU 1 to start necessary processing for power-off (step 119). The CPU 1, upon receiving the interrupt, again starts the processing for preserving a work state (step 120). When the work state preservation processing is completed, the CPU 1 notifies the power supply controller 9 of the completion of the work state preservation by writing a particular command into the command register 94 (step 121). This notification is received by the power supply switch controller 92 in the power supply controller 9 which in turn operates the switch 91 to stop supplying electric power to the respective sections of the information processing apparatus 17a and informs the network controller 18 of the second power-off state of the information processing apparatus 17a (step 122). The foregoing processing permits the information processing apparatus 17a, even in power-off state, to respond to the connection acknowledgement request frame transmitted from the information processing apparatus 17b by temporarily turning on the power source upon receiving the frame, thereby making it possible to maintain the logical connection with the information processing apparatus 17b.

Finally explained is a procedure of second turn-on of the power source by request from the user when the information processing apparatus 17a preserved a work state and remains in power-off state.

Figure 27:
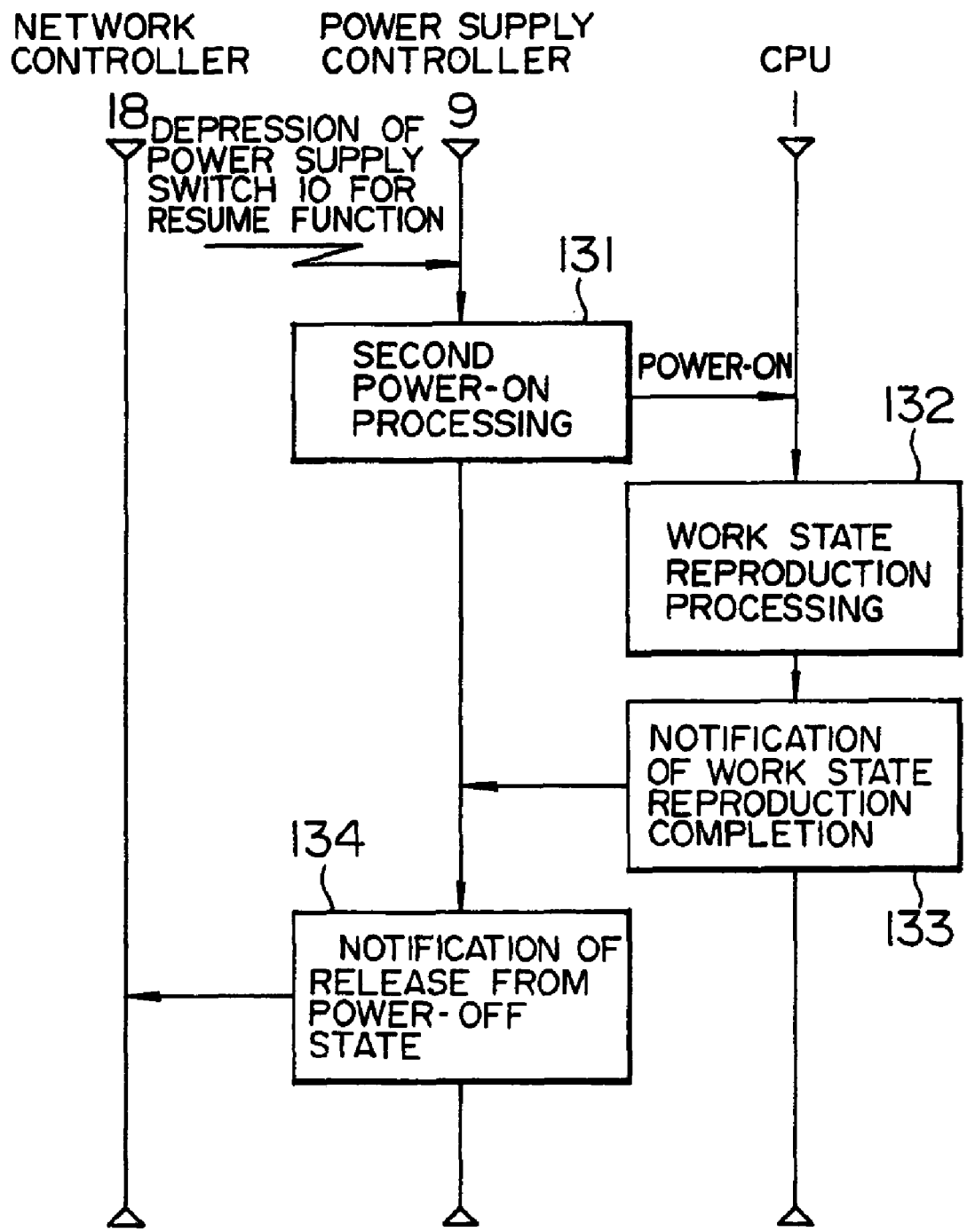
FIG. 27 is a sequence diagram representing processing for again turning on the power source in the eighth embodiment of the present invention.

Referring to a sequence diagram of FIG. 27, 25 when the power supply switch 10 for resume function is depressed in power-off state, the power supply switch controller 9 sets in the status register 93 a value indicating that this power-on requires reproduction of the work state, and operates the switch 91 to start supplying electric power onto the power supply line 96 (step 131). Since this second power-on was required by the user, all of the sections including the display unit 5 of the information processing apparatus 17a are supplied with electric power. The CPU 1, supplied with electric power, starts the reset processing using the program stored in the ROM 6. After the power-on, the CPU 1 first reads the contents of the status register 93 to recognize the necessity of work state reproduction and starts the work state reproduction processing (step 132). Upon completing the reproduction of the work state, the CPU 1 informs the power supply controller 9 of the completion of the work state reproduction by writing a particular command into the command register 94, and goes on with the processing from the reproduced work state at the power-off time (step 133). The power supply controller 9, when informed of the completion of the work state reproduction processing, notifies this to the network controller 18 (step 134). Since this is a second power-on requested by the user, the timer 95 is not started. The notification causes the network controller 18 to immediately notify the CPU 1 with an interrupt when it receives a frame at a later time. The foregoing processing permits the user to reproduce the work state when the power source was turned off and proceeds to the work from that state.

Next, a ninth embodiment of the present invention will be described with reference to FIGS. 28 and 29.

Figure 28:
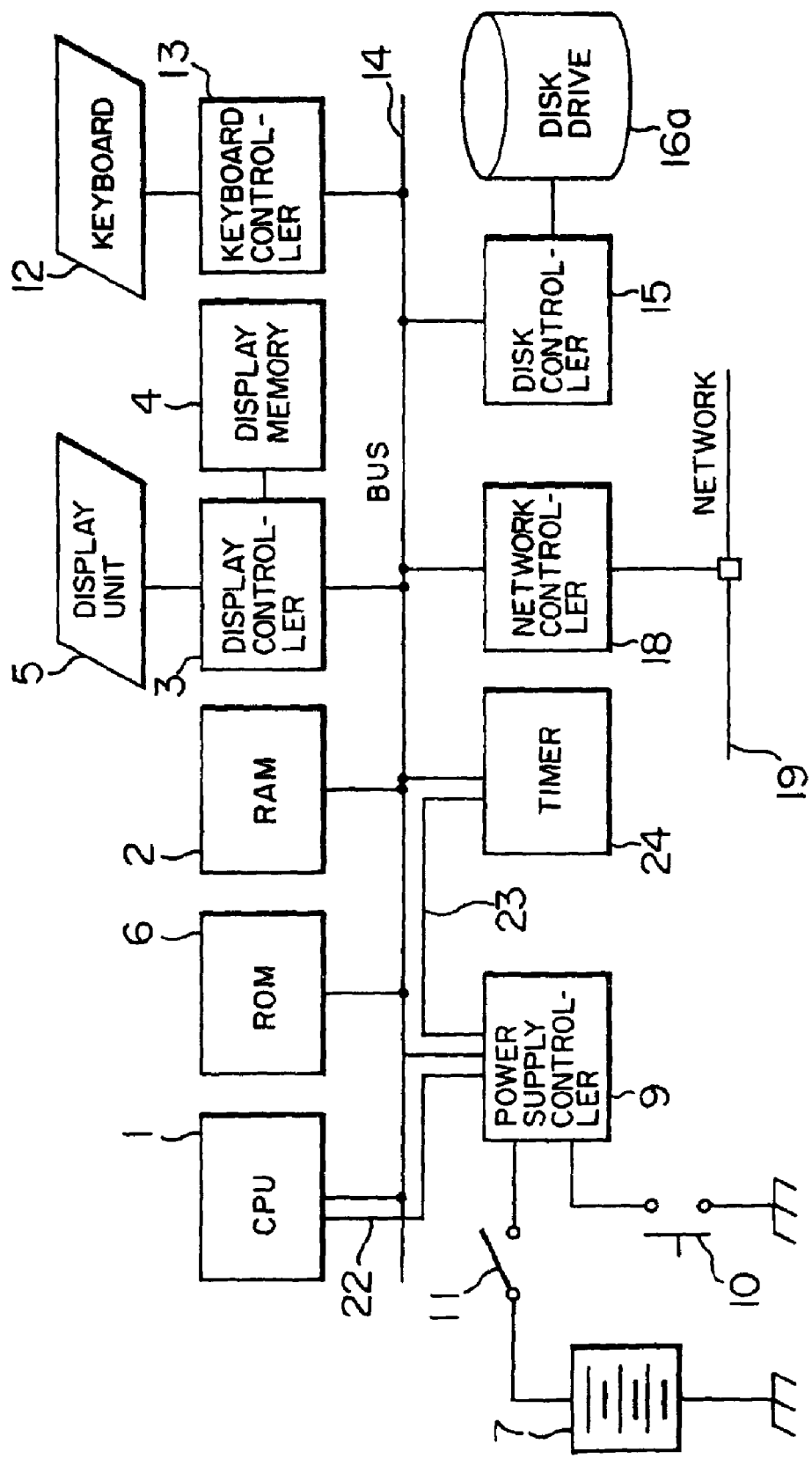
FIG. 28 is a block diagram illustrating the configuration of an information processing apparatus according to a ninth embodiment of the present invention.

FIG. 28 illustrates the configuration of an information processing apparatus 17a according to the ninth embodiment of the present invention. In the drawing, reference numeral 24 designates a timer for detecting the lapse of a specified time.

Figure 25:
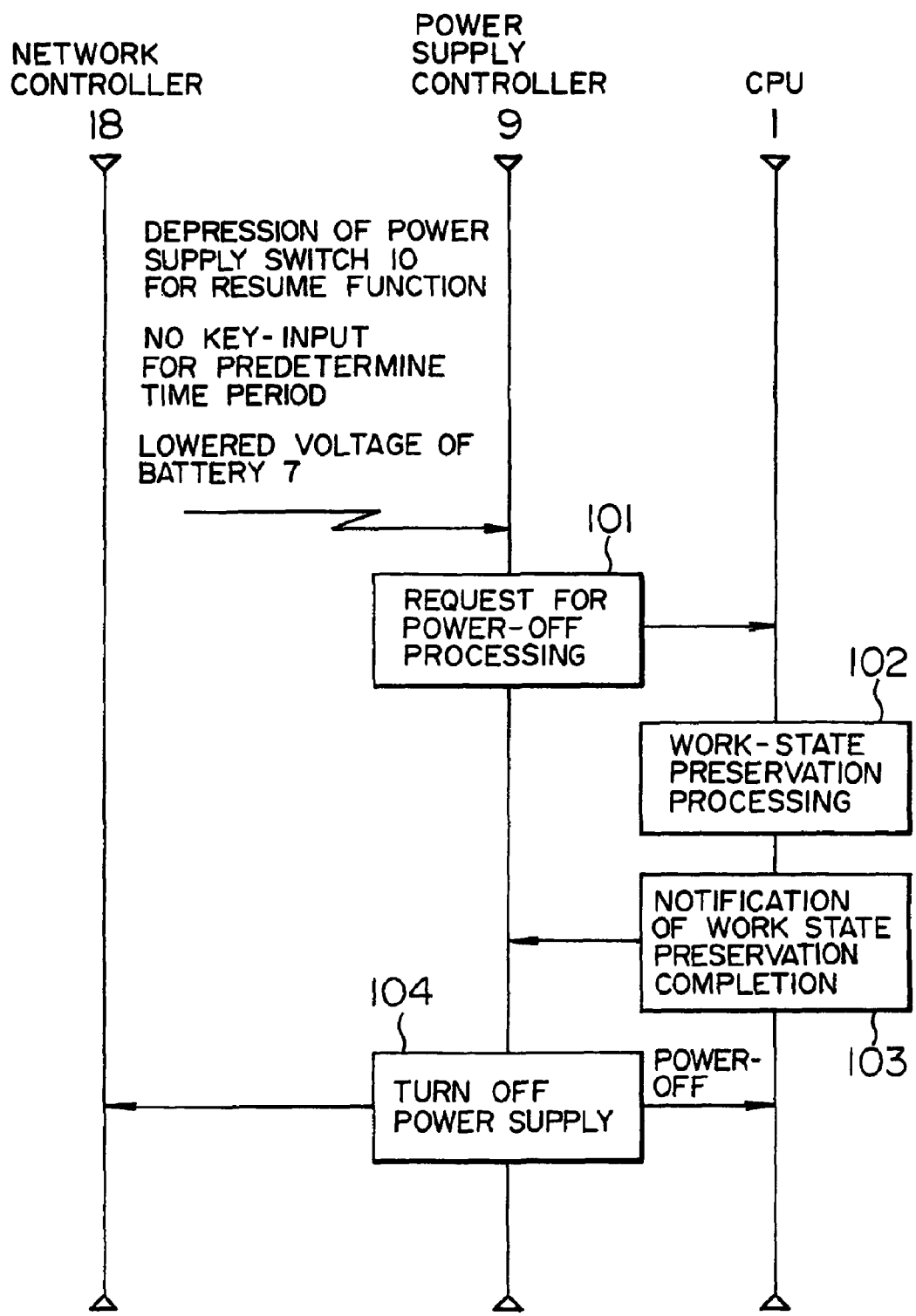
FIG. 25 is a sequence diagram representing power-off processing in the eighth embodiment of the present invention.

In the operations of the resume function according to this embodiment, a procedure of the information processing apparatus 17a for preserving a work state and falling into the power-off state and a procedure of again turning on the power source by request of the user are identical to those represented by the sequence diagrams shown in FIGS. 25 and 27, respectively, provided the network controller 18 is replaced with the timer 24. When informed of the power-off state, the timer 24 does not immediately notify the lapse of a specified time to the: CPU 1 but to the power supply controller 9, whereas, when informed of release of the power-off state, the timer 24 returns to immediately notify the lapse of the specified time to the CPU 1.

Figure 29:
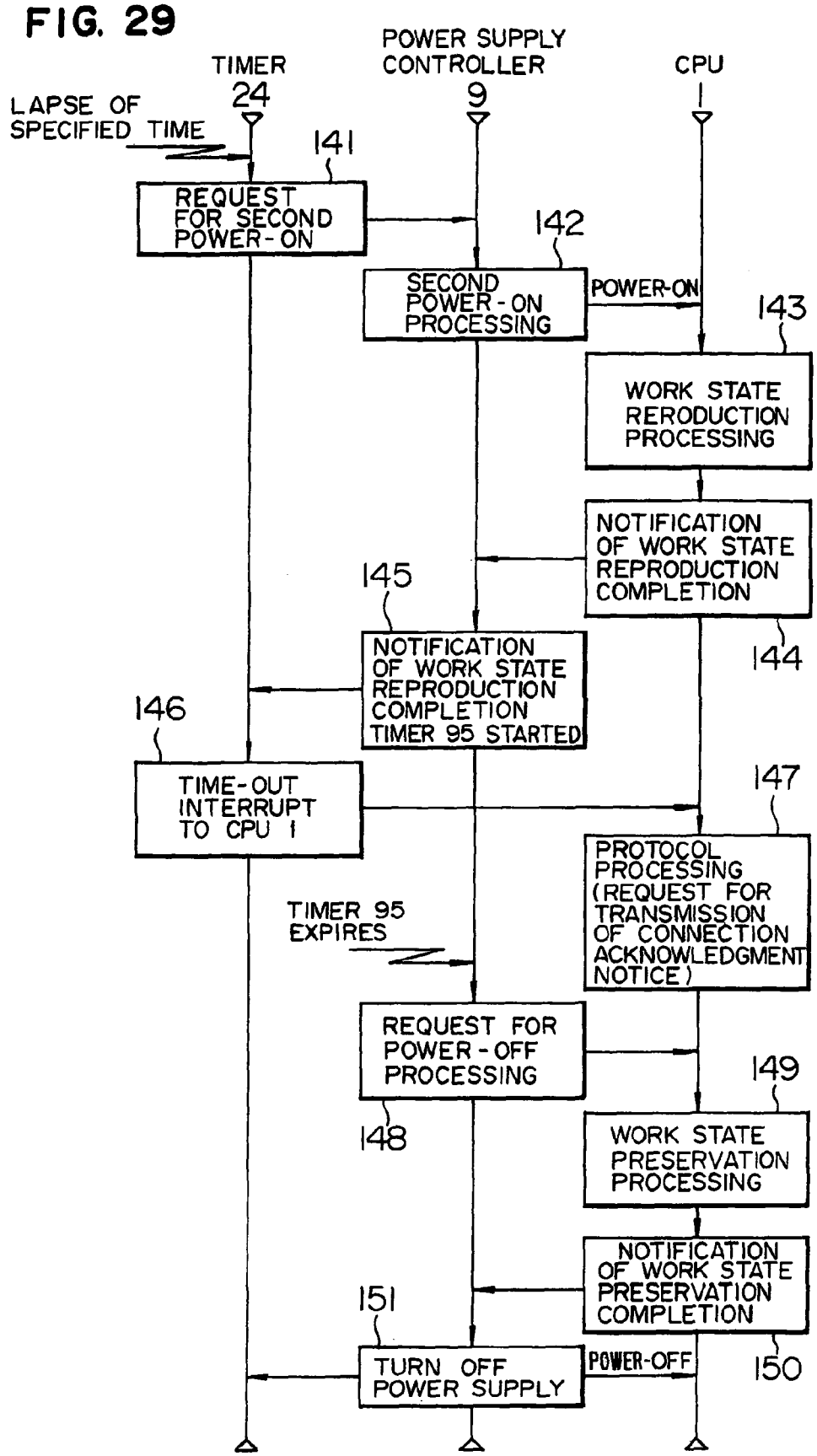
FIG. 29 is a sequence diagram representing processing for transmitting a connection acknowledgement notice frame in the ninth embodiment of the present invention.

Explained herein is a procedure of transmitting a connection acknowledgement notice frame from the information processing apparatus 17a to the information processing apparatus 17b when the timer detects the lapse of a specified time in power-off state with reference to a sequence diagram of FIG. 29.

When the timer 24 detects the lapse of the specified time with the information processing apparatus 17a being in the power-off state, the timer 24 issues a power-on request to the power supply controller 9 through the power supply control signal line 23 and reserves a time-out-interrupt to the CPU 1 (step 141). This power-on request is received by the power supply switch controller 92 in the power supply controller 9 which sets in the status register 93 a value indicative of a power-on requiring the reproduction of the work state and operates the switch 91 to start supplying electric power onto the power supply line 96 (step 142). However, since this is a temporary power-on requested by the timer 24, the display unit 5 is not supplied with electric power. The CPU 1, supplied with electric power, starts the reset processing with the program stored in the ROM 6. After the power-on, the CPU first reads the contents of the status register 93 to recognize the necessity of work state reproduction and starts the work state reproduction processing (step 143). When the reproduction of the work state is completed, the CPU 1 informs the power supply controller 9 of the completion of the work state reproduction by writing a particular command into the command register 94 and goes on with the processing from the reproduced work state at the power-off time (step 144). The power supply controller 9, when informed of the completion of the work state preservation processing, notifies this to the timer 24 and starts the timer 95 (step 145). The timer 24, notified of the completion of the work sate reproduction processing, issues the reserved time-out interrupt to the CPU 1 at this time (step 146). The CPU 1, upon receiving the time-out interrupt, requests the network controller 18 to transmit a connection acknowledgement notice frame (step 147). The network controller 18, responsive to the frame transmission request, transmits the connection acknowledgement notice frame to the information processing apparatus 17b (step 147). Afterward, when the timer 95 started at step 145 expires, this time-out is notified to the power supply switch controller 92 which generates an interrupt to the CPU 1 through the interrupt signal line 22 for requesting the CPU 1 to start processing necessary to turn off the power source (step 148). The CPU 1, upon receiving the interrupt, again starts the work state preservation processing (step 149). When the work state preservation processing is completed, the CPU 1 notifies the power supply controller 9 of the completion of the work state preservation by writing a particular command into the command register 94 (step 150). This notification is received by the power switch controller 92 in the power supply controller 9 which operates the switch 91 to stop supplying electric power to the respective sections of the information processing Apparatus 17a and notifies the second power-off state to the timer 24 (step 151). The foregoing processing permits the information processing apparatus 17a, even in power-off state, to transmit the connection acknowledgement notice frame by again turning on the power source for a temporary time period with a timer interrupt, thereby making it possible to maintain the logical connection with the information processing apparatus 17b.

Next, a tenth embodiment of the present invention will be described with reference to FIG. 30.

Figure 30:
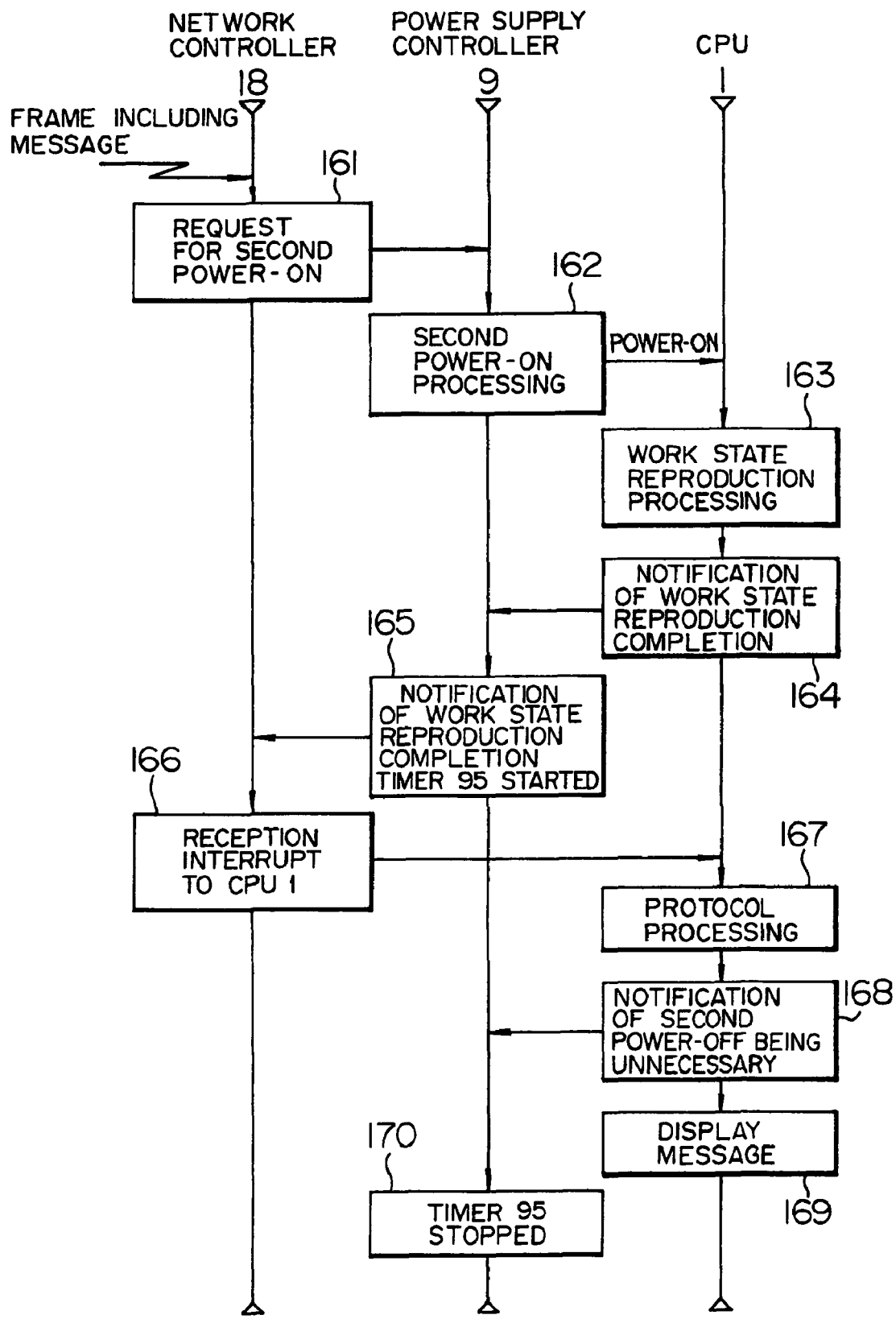
FIG. 30 is a sequence diagram representing message receiving processing in a tenth embodiment of the present invention.

FIG. 30 is a sequence diagram illustrating the processing of the tenth embodiment of the present invention. This sequence diagram represents processing performed by the information processing apparatus 17a when receiving a frame from the information processing apparatus 17b including a message to be displayed to the user when the information processing apparatus 17a remains in power-off state while maintaining the logical connection with the information processing apparatus 17b.

When the network controller 18 receives a frame including a message to be displayed to the user from the information processing apparatus 17b, the network controller 18, the power supply controller 9 and the CPU 1 respectively perform a series of processing from step 161 to step 166. This processing is identical to the processing from step 111 to step 116 shown in the sequence diagram of FIG. 26. The CPU 1, upon receiving a frame reception interrupt from the network controller 18, starts protocol processing for that frame (step 167). In this processing, when the CPU 1 knows that the frame includes a message to be displayed to the user, the CPU 1 writes a particular command into the command register 94 to notify the power supply controller 9 that second power-off is not necessary (step 168), and displays the message on the display unit 5 through the display controller 3 (step 169). The power supply switch controller 92 in the power supply controller 9, when receiving this notification, stops the timer 95 started at step 165 and operates the switch 91 to start supplying electric power to the display unit 5 which was not supplied with electric power at step 162 (step 170). The foregoing processing permits the information processing apparatus 17a to remain in power-off state while maintaining the logical connection with the information processing apparatus 17b to display a message to be displayed to the user by automatically turning on again the power source, when receiving such a message. Incidentally, while the tenth embodiment unconditionally displays any received message, the user may be asked before displaying a message at step 169 whether or not the message should be displayed such that the message is displayed only when the user has so instructs. In this case, if no instruction is given within a predetermined time period, that is, if the user is not present in front of the information processing apparatus 17a, the message is not displayed, the work state is again preserved, and the power supply controller 9 is instructed to turn off the power source.

What is claimed:

1. An information processing apparatus comprising:
   a memory unit;
   a display unit; and
   a processing unit being adapted to execute a process in accordance with a program stored in the memory unit,
   wherein the memory unit having a plurality of work state holding areas for storing information regarding work of the information processing apparatus as a set of states of said processing unit and said display unit, and
   wherein said information processing apparatus is adapted to store said information regarding work of the information processing apparatus into one of said a plurality of work state holding areas, and a read information from an arbitrary one of said work state holding areas to reproduce the work state.

2. An information processing apparatus according to claim 1, wherein said memory unit comprising:
   a first memory unit where data stored therein is lost after the power is switched off, and a second memory where data stored therein is hold after the power is switched off, said plurality of work state holding areas are provided in said memory unit,
   wherein said processing unit is adapted to execute a process for reproducing the work state regarding the stored information if the power is switched on.

3. An information processing apparatus according to claim 2, wherein said second memory unit comprising:
   a storage-medium without the need of battery backup.

4. An information processing apparatus according to claim 1, wherein each of said plurality of work state holding areas stores an identifier therein for distinguishing own work state holding area from the other work state holding areas, the identifier is used by a user for designating the work state holding area.

5. A processing apparatus according to claim 4, wherein the identifier is uniquely associated with a user.

* * * * *